United States Patent
Zmudzinski et al.

(10) Patent No.: US 11,030,120 B2
(45) Date of Patent: Jun. 8, 2021

(54) HOST-CONVERTIBLE SECURE ENCLAVES IN MEMORY THAT LEVERAGE MULTI-KEY TOTAL MEMORY ENCRYPTION WITH INTEGRITY

(71) Applicant: Intel Corporation, Santa Clara, CA (US)

(72) Inventors: Krystof C. Zmudzinski, Forest Grove, OR (US); Simon P. Johnson, Beaverton, OR (US); Raghunandan Makaram, Northborough, MA (US); Francis X. McKeen, Portland, OR (US); Carlos V. Rozas, Portland, OR (US); Meltem Ozsoy, Portland, OR (US); Ilya Alexandrovich, Yokneam Illit (IL); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/454,481

(22) Filed: Jun. 27, 2019

(65) Prior Publication Data
US 2021/0064546 A1    Mar. 4, 2021

(51) Int. Cl.
*G06F 12/14*    (2006.01)
*G06F 12/1045*    (2016.01)
(Continued)

(52) U.S. Cl.
CPC ........ *G06F 12/1408* (2013.01); *G06F 9/4406* (2013.01); *G06F 11/0772* (2013.01);
(Continued)

(58) Field of Classification Search
CPC ......... G06F 12/1408; G06F 2212/1052; G06F 21/602; G06F 12/1441; G06F 21/64;
(Continued)

(56) References Cited

U.S. PATENT DOCUMENTS

2013/0159726 A1* 6/2013 Mckeen .............. G06F 21/72
    713/189
2013/0238907 A1* 9/2013 Debout .............. G06F 12/0246
    713/193

(Continued)

FOREIGN PATENT DOCUMENTS

| EP | 1909185 A2 | 4/2008 |
| EP | 3049992 A1 | 8/2016 |
| WO | 2015/047789 A1 | 4/2015 |

OTHER PUBLICATIONS

European Search Report and Search Opinion, EP App. No. 20162644.7, dated Dec. 11, 2020, 12 pages.

*Primary Examiner* — Hashem Farrokh
(74) *Attorney, Agent, or Firm* — Nicholson De Vos Webster & Elliott LLP

(57) ABSTRACT

A processor includes a cryptographic engine to control access, using an secure region key identifier (ID), to one or more memory range of memory allocable for flexible conversion to secure pages of architecturally-protected memory regions, and a processor core. The processor core is to, responsive to receipt of a request to access the memory, perform a walk of page tables and extended page tables to translate a linear address of the request to a physical address of the memory. The processor core is further to determine that the physical address corresponds to an secure page within the one or more memory range of the memory, that a first key ID located within the physical address does not match the secure region key ID, and issue a page fault and deny access to the secure page in the memory.

21 Claims, 18 Drawing Sheets

(51) Int. Cl.
  *G06F 12/0882* (2016.01)
  *G06F 11/30* (2006.01)
  *G06F 12/0871* (2016.01)
  *G06F 9/4401* (2018.01)
  *G06F 11/07* (2006.01)
  *G06F 12/0891* (2016.01)

(52) U.S. Cl.
  CPC ...... *G06F 11/3037* (2013.01); *G06F 12/0871* (2013.01); *G06F 12/0882* (2013.01); *G06F 12/0891* (2013.01); *G06F 12/1063* (2013.01)

(58) Field of Classification Search
  CPC .... G06F 21/62; G06F 21/575; G06F 12/0891; G06F 11/3037; G06F 12/1063; G06F 9/4406; G06F 12/0871; G06F 11/0772
  USPC ........................................................ 711/163
  See application file for complete search history.

(56) References Cited

U.S. PATENT DOCUMENTS

| | | | |
|---|---|---|---|
| 2014/0223129 A1* | 8/2014 | McCoy | G06F 12/1466 711/164 |
| 2017/0083724 A1* | 3/2017 | Chhabra | G06F 12/1408 |
| 2017/0372088 A1 | 12/2017 | Zhao et al. | |
| 2019/0095334 A1 | 3/2019 | Shanbhogue et al. | |
| 2019/0102324 A1 | 4/2019 | Ozsoy et al. | |

* cited by examiner

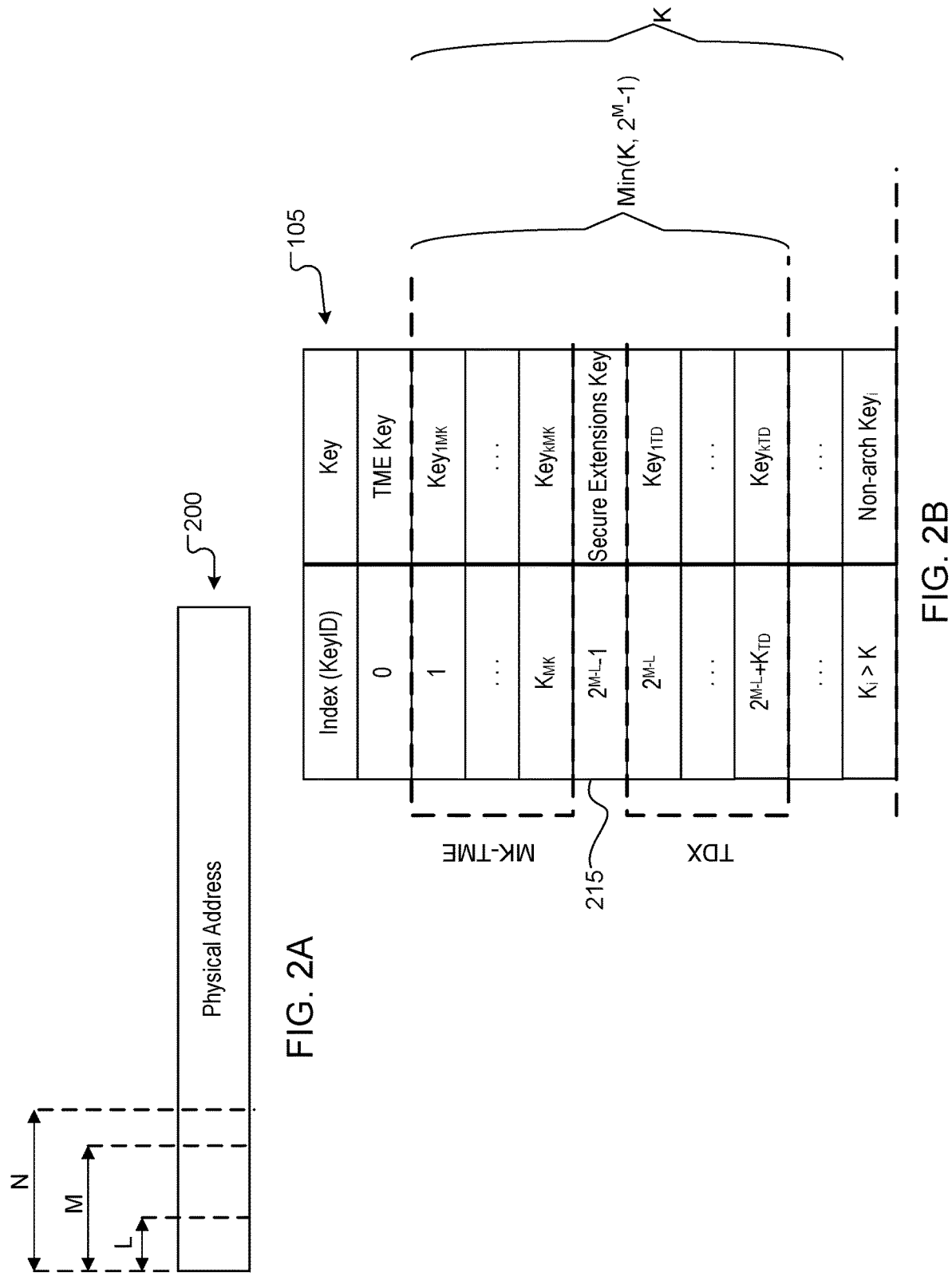

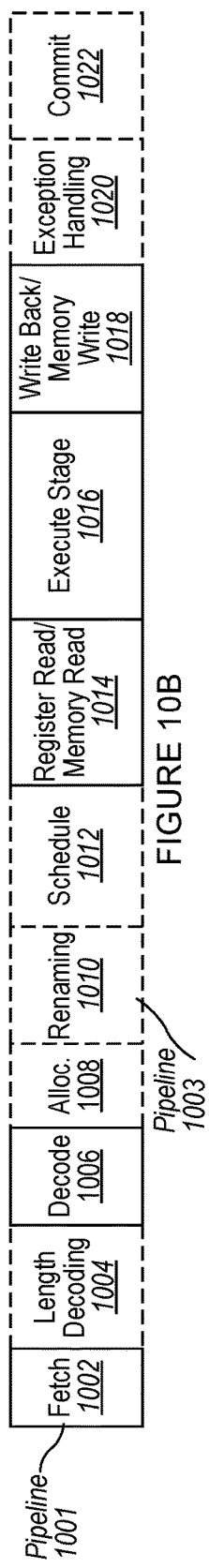
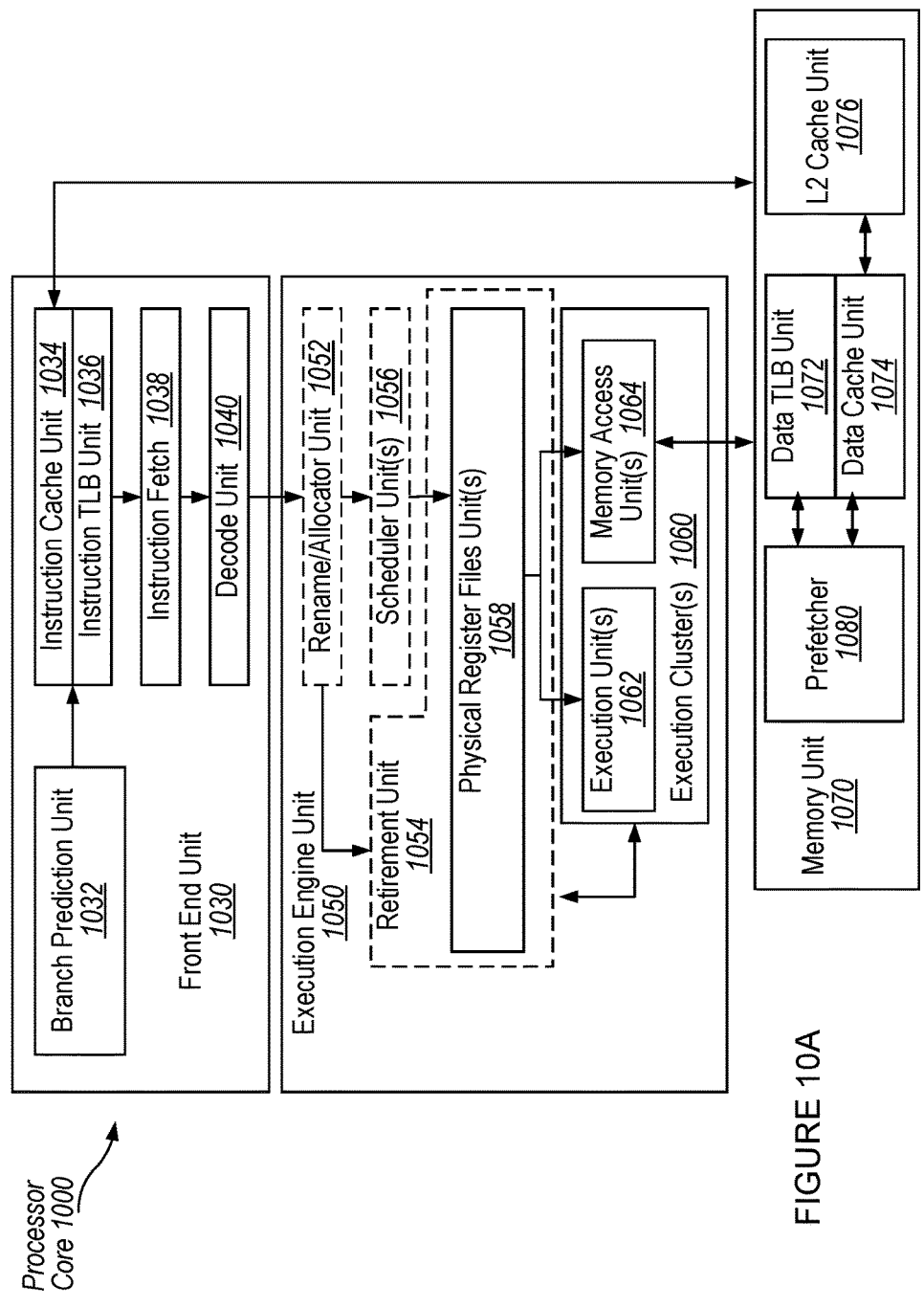
FIGURE 10B
FIGURE 10A

HOST-CONVERTIBLE SECURE ENCLAVES IN MEMORY THAT LEVERAGE MULTI-KEY TOTAL MEMORY ENCRYPTION WITH INTEGRITY

TECHNICAL FIELD

The disclosure relates to protection of data stored in memory of a computer system, and more particularly, to host-convertible secure regions within memory that leverage multi-key total memory encryption with integrity.

BACKGROUND

Modern processors are designed to protect sensitive data in memory from both hardware and software attacks. Regions of memory so protected are referred to herein as protected memory. Some processors provide cryptographic mechanisms for encryption, integrity, and replay protection. Memory encryption protects the confidentiality of memory-resident data. On the other hand, integrity protection prevents an attacker from causing any hidden modifications to the cipher text (e.g., encrypted data, as opposed to plaintext which is unencrypted data) in memory, and replay protection eliminates any undetected temporal substitution of the cipher text. In the absence of such protections, an attacker with physical access to the system can record snapshots of data lines and replay them at a later point in time.

A static mode of protected memory management statically reserves a predetermined memory range of main memory that uses enclave (or secure) pages and is the legacy mode employed by many processors. An updated mode of protected memory management allows flexible conversion of main memory as protected memory, greatly increasing the amount of memory available as protected memory, which also increases the efficiency of protected memory allocation. In order to change the mode of memory protection management, a basic input/output system (BIOS) determines which mode to employ, and communicates that mode to an operating system upon boot of the computer system. Accordingly, in order to change the mode of protected memory management after the computer system is running, the computer system is rebooted so that the BIOS can reset the mode of protected memory management for the operating system to use. This reboot process can be problematic as it consumes valuable computing time and resources.

BRIEF DESCRIPTION OF THE DRAWINGS

FIG. 2A is a block diagram of a physical memory address that includes a portion of the address bits allocated to key identifiers (IDs) according to various implementations.

FIG. 2B is a block diagram illustrating delineation of cryptographic key identifiers (ID) for use in MK-TME, trust domain extensions (TDX), and a secure region key ID corresponding to a key for use with the host-convertible secure regions in memory according to an implementation.

FIG. 10A is a block diagram illustrating an in-order pipeline and a register renaming stage, out-of-order issue/execution pipeline according to one implementation.

FIG. 10B is a block diagram illustrating a micro-architecture for a processor or an integrated circuit that may implement hardware support for a multi-key cryptographic engine, according to an implementation of the disclosure.

DETAILED DESCRIPTION

Figure 1A:
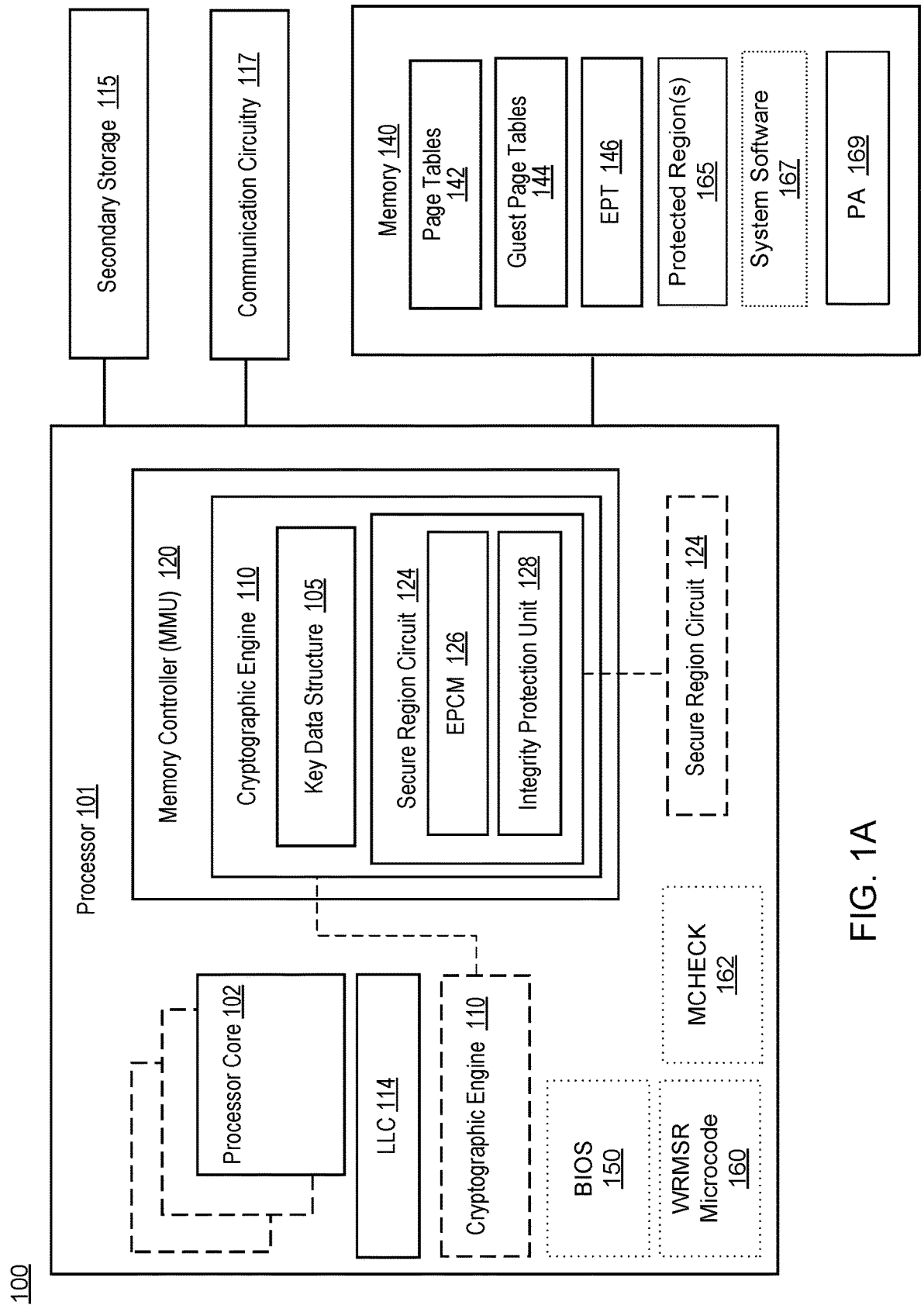
FIGS. 1A and 1B are system block diagrams of a computing device for employment of host-convertible secure regions in memory that leverage multi-key total memory encryption with integrity (MK-TMEi) according to implementations.

A current trend in computing is the placement of data and enterprise workloads in the cloud by utilizing hosting services provided by cloud server provider (CSPs). As a result of the hosting of the data and enterprise workloads in the cloud, customers (e.g., tenants) of the CSPs are requesting better security and isolation solutions for their workloads. In particular, customers seek solutions that enable the operation of CSP-provided software outside of a Trusted Computing Base (TCB) of the tenant's software. The TCB of a system refers to a set of hardware, firmware, and/or software components that have an ability to influence the trust for the overall operation of the system. Accordingly, for example, a virtual machine monitor (VMM or hypervisor) establishes and controls a virtual machine (VM), which executes the tenant software. Tenants therefore want the components of the VMM to operate outside of the tenant's TCB. If the VMM is executed as software on top of hardware of a virtualized server, the VMM is considered untrusted software.

In furtherance of data security in CSP-based systems, various techniques have been employed to protect sensitive data residing in regions of memory, e.g., of CSP servers. Some system processors provide cryptographic mechanisms for encryption, integrity, and replay protection. Memory encryption protects the confidentiality of memory-resident data. For example, total memory encryption (TME) may encrypt data that is moving from a processor core to memory and may decrypt the encrypted data on its way back to the processor core. Additionally, the CSP server may support the use of multiple encryption keys, e.g., a different key for each secure domain serviced by the server, which could be dozens or thousands of domains. Accordingly, a TME engine may be adapted to securely manage the use of multiple encryption keys as a multi-key TME (or MK-TME) engine, which may be referred to more generally herein as a cryptographic engine.

Domains may refer to workloads, such as a client machine (e.g., virtual machine), an operating system, an application, or other types of workloads the server supports that may be associated with different tenants. For example, a secure domain may be a tenant workload, such as an operating system, along with other ring-3 applications executing on top of the operating system, or a VM executing on top of a VMM, which itself is a separate domain, along with other ring-3 applications. The benefit of supporting the use of multiple keys is to provide cryptographic isolation between different tenant domains, e.g., one secure domain cannot access encrypted data if that encrypted data belongs to a different secure domain being protected with a different encryption key. These benefits extend to the ability of a CSP to support a growing number of tenant workloads on the same server, or within the same server cluster, to adapt to growing demands for cloud-based resources.

The disclosure describes hardware support of static mode of protected memory management on a host-convertible enclave (e.g., secure region) platform built on top of MK-TME technology. In one implementation, the disclosure provides for an operating system (OS) of a computer system to choose between two modes of protected memory management. The two modes may include a static mode that uses static allocation of architecturally-protected memory and a host-convertible secure region mode that enables flexible allocation of architecturally-protected memory regions to multiple memory ranges of main memory.

In implementations, an enclave refers to a secure container, e.g., an isolated or secure memory region of code and data within main memory that is architecturally-protected with a level of security, which includes at least encryption but may also include integrity. The memory an enclave (e.g., secure region) uses is also sometimes referred to as an enclave page cache (EPC), which is protectable using architecture that employs secure instructions referred to as secure guard extensions (SGX) by Intel® Corporation of Santa Clara, Calif. Furthermore, the host-convertible secure region mode can be referred to as host-convertible (HC) EPC (or HC-EPC) mode. Memory that is HC-EPC memory may be managed by system software such as the OS or a virtual machine monitor (VMM). The ability to choose between the two modes of protected memory management also enables switching between two operating systems on dual-boot (or multi-boot) platforms without user intervention (e.g., changing basic input/output system (BIOS) settings) or multiple reboots when a first OS is supported with legacy memory protection and a second OS is supported with host-convertible secure pages.

This dual-mode memory protection, available to the first OS or to both the first OS and the second OS, is made possible through a processor core of a processor executing a BIOS, which is configured to set up both modes of protected memory management from which the OS may choose (understanding that the disclosure can be extended to more than two modes of protected memory management). For example, the BIOS may write first information and second information to a predetermined area of main memory that operates like an electronic mailbox, delivering information to one or more operating systems for use in selecting between modes of protected memory management. The first information, for example, may delineate a memory range of the main memory allocable for conversion to secure pages. The second information may delineate sub-sets of the memory range allocated for reserved memory, which is not host-convertible to secure pages.

When operating in the host-convertible secure region (HC-EPC) mode, the memory range may include multiple sections (or ranges) of convertible pages that can be converted to secure pages or non-secure pages. Software executing on the processor can identify a page in the main memory to be converted and can use a page conversion instruction (or function) to convert the page. The processor core, in response to a page conversion instruction, can determine from the page conversion instruction the convertible page in the memory range to be converted and convert the convertible page to be a secure page or a non-secure page. It is the responsibility of system software (e.g., OS or VMM or the like) to identify a page that can be converted. For example, if the OS utilizes a non-secure page, the OS can identify a secure page (if a non-secure page is not available) and execute the page conversion instruction on this secure page to generate a non-secure page in memory.

In some implementations, the processor core or an input/output memory management unit (IOMMU), for example, may look up a state of a target memory page on each memory access to determine whether the access is of a secure or a non-secure page, e.g., so that only secure region code can access secure region data in secure pages. These involve additional memory accesses to enforce such isolation from unsecured processes.

In order to perform the same check without additional memory accesses, additional hardware may be employed as described in detail herein, including using a reserved secure region (or EPC) key ID within physical addresses of memory that indicates the page corresponding to such physical addresses are secure pages as opposed to non-secure pages. In this way, the system software may then map pages of memory according to whether they are secure or non-secure pages. The system software may also convert the memory pages back and forth between secure and non-secure pages (and vice versa) with special conversion functions of existing enclave (ENCLS) leaf instructions, although other conversion instructions may be used. System hardware may then implement architecturally-controlled access semantics using the reserved secure region key ID in addition to other secure guard extensions (SGX) mode access checks. When Total Encryption Memory (TEM) of SGX is employed, replay protection in servers is not required because of different security requirements by the cryptographic engine in lieu of counter-mode encryption. Use of TEM within the host-convertible enclave page platform may significantly speed up memory operations.

Figure 1B:
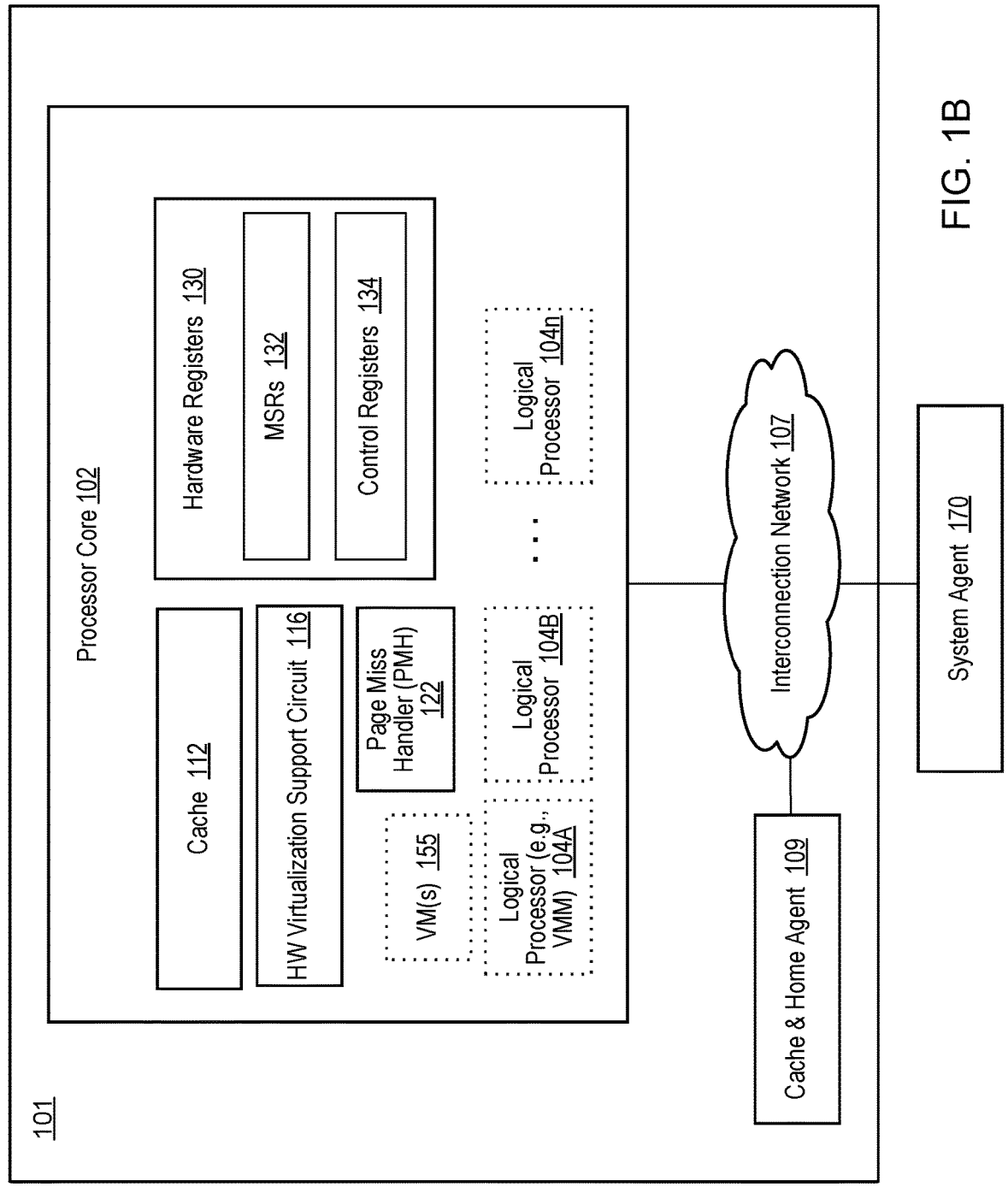

FIGS. 1A and 1B are system block diagrams of a computing device 100 for employment of host-convertible secure regions in memory that leverage multi-key total memory encryption with integrity (MK-TMEi) according to implementations. In one implementation, the computing device 100 includes a processor 101, secondary storage 115, communication circuitry 117, and memory 140 and/or other memory device coupled as illustrated and discussed herein.

In various implementations, the processor 101 includes one or more processor core 102, a cryptographic engine 110, a memory controller 120 (e.g., a memory management unit), a last level cache (LLC) 114 (e.g., LLC corresponding to each processor core), basic input/output system (BIOS) firmware 150 (or simply "BIOS"), write model-specific register (WRMSR) microcode 160, and memory check (MCHECK) firmware 162 (or simply "MCHECK"). The processor 101 may be embodied as a single or multi-core processor(s), digital signal processor, microcontroller, or other processor or processing/controlling circuit.

In implementations, the memory 140 (e.g., main memory) includes (e.g., stores) page tables 142, extended page tables (EPT) 146, is partitioned into protected regions 165 of secure regions (e.g., that store EPC or enclave pages), stores system software 167, and includes a predetermined area (PA) 169 of the memory for access by both the BIOS and the system software 167. The protected regions 165 are to be understood as architecturally-protected memory regions secured by secure instructions such SGX instructions.

In one implementation, the memory controller 120 includes the cryptographic engine 110, which may further store a key data structure 105, and a secure region circuit 124. The secure region circuit 124 may also be optionally located in uncore and coupled to the cryptographic engine (illustrated in dashed lines). The secure region circuit 124 may further include an enclave page cache map (EPCM) 126 and an integrity protection unit 128. The EPCM 126 is a secure structure used by the processor 101 to track contents of the protected regions 165 of memory, e.g., the enclave (or secure) pages. The EPCM 126 may hold an entry for each page that is currently loaded into the protected regions 165, is not accessible by software, and the layout of the EPCM fields may be implementation specific for management of the secure pages.

In implementations, the integrity protection unit 128 provides counter-mode encryption by creating a message authentication code (MAC), which in one implementation, is a hash of the combination of physical address (PA), data, and a key, e.g., the secure region (e.g., enclave or EPC) key associated with the enclave key ID. The integrity protection unit 128 may generate a MAC on each write to the an secure page in the protected regions 165, and may authenticate the MAC on each read by regenerating the MAC and comparing it to the MAC stored in a metadata region of the memory 140 associated with each data line. The integrity protection unit in this way may provide the integrity of the MK-TMEi engine, which may be represented by the cryptographic engine 110 in one implementation.

As illustrated in FIG. 1B, each processor core 102 may include cache 112, a hardware virtualization support circuit 116, a page miss handler (PMH) 122, and hardware registers 130. Each processor core 102 may communicate via an interconnection network 107 on a multi-core processor package with a corresponding cache and home agent (CHA) 109 and with one or more system agents 170 that exist off the multi-core processor package. The CHA 109 may cache a copy of a cache line of memory that is homed in (e.g., local to) that memory at a cache line granularity. The CHA 109 may implement one of a directory-based or a snoopy-based coherence tracking scheme for shared cache and memory across multiple processor cores. In different implementations, the interconnection network 107 is a Peripheral Component Interconnect (PCI™) bus, such as the Peripheral Component Interconnect express (PCIe™) bus, or another custom bus. The system agents 170 may include disk storage, device drivers, I/O devices or the like.

The processor core 102 may execute instructions to run a number of hardware threads, also known as logical processors, including the first logical processor 104A, a second logical processor 104B, and so forth until an Nth logical processor 104n. In one implementation, the first logical processor 104A is a virtual machine monitor (VMM) or hypervisor. A number of virtual machines (VMs) 155 may be executed and controlled by the VMM. Additionally, as discussed, the VMM may assign key IDs, which are associated with corresponding encryption keys, to various secure domains (e.g., VMM, VMs) operating on the computing device 100.

With further reference to FIG. 1B, the hardware registers 130 may include, for example, a number of general purposes registers (not illustrated, e.g., EAX, EBX, ECX, EDX, and the like), model-specific registers 132 (or MSRs), and control registers 134 (e.g., CR1, CR2, CR3, and the like). The memory 140 may further include page tables 142 for paging, and guest pages tables 144 and extended page tables (EPT) 146 used for address translations by the VMM as will be described in more detail with reference to FIGS. 6 and 7A-7B.

In one implementation, the computing device 100 is a server that services the domains, e.g., different workloads such as a client machine, an operating system, an application, or other types of workloads being supported. In implementations, the memory controller 120 may include (or be coupled to) a cryptographic engine 110 (such as a MK-TMEi engine) having the key data structure 105.

In various implementations, the cryptographic engine 110 may be embodied as a microcontroller, microprocessor, functional block, logic, or other circuit or collection of circuits capable of performing the functions described herein. The cryptographic engine 110 may encrypt and/or decrypt domain data read from or written to memory using domain-specific encryption keys, and therefore may work in conjunction with the memory controller 120 or be integrated within the memory controller 120. The cryptographic engine 110 may cache the internal key data structure 105, which the cryptographic engine 110 may use to identify domain accesses to be protected. The key data structure 105 may be a table or other data structure capable of being indexed and stored within hardware of the cryptographic engine 110. In one implementation, the hardware is a cache, a set of registers, or other flash memory.

In various implementations, the key data structure 105 may be controlled and/or programmed by hardware of the cryptographic engine 110 or by trusted software, for example using a crypto engine programming support circuit of the processor 101. The key data structure 105 may be adapted to store keys and domain information for the domains. The encryption keys and/or other secret information of the key data structure 105 may not be available to untrusted software, e.g., OS or VMM. In some implementations, the cryptographic engine 110 may be incorporated along with the memory controller 120 and the processor core 102 in a system-on-a-chip (SoC) of the computing device 100.

FIG. 2A is a block diagram of a physical memory address 200 that includes a portion of the address bits allocated to key IDs according to various implementations. This portion of address bits may encompass N bits, which may be at least log 2K, where K is the total number of available encryption key IDs. Use of at least some of upper address bits of the physical memory address to encode for key IDs may be advantageous, as systems rarely have memory spaces so large that all physical address bits are required to map to the physical addresses in the memory 140. In other implementations, however, the N bits for the key IDs may be located elsewhere within the physical memory address, including beyond the maximum physical address width. In implementations, the N bits may be further partitioned in M bits fewer than the N bits and in L bits that are fewer than the M bits for reasons discussed with reference to FIG. 2B.

FIG. 2B is a block diagram illustrating delineation of cryptographic key identifiers (ID) for use in MK-TME, trust domain extensions (TDX), and a secure region key ID corresponding to a key for use with the host-convertible secure regions in memory according to an implementation. These key IDs may be stored in the key data structure 105 in relation to the encryption keys to which they correspond. In some implementations, the architecture of the computing device 100 supports TDX keys (e.g., private keys), MK-TME keys (e.g., shared keys), and an additional secure extensions key. The MK-TME keys may be shared with and/or managed by software such as the VMM and may be reassigned from one domain to another domain, e.g., where one domain is decommissioned and the secure regions are freed up for use by another domain.

As illustrated, the keys may be indexed against a key ID in the key data structure 105. A first key may be a TME key, which is a platform reserved key reserved to internal processor use. Subsequent keys of the key data structure 105 may include a range of $1\text{-}K_{MK}$ keys for use with MK-TME technology, a secure extensions key 215 ($2^{M-L}-1$) to encrypt data being stored in and read out of the secure pages of the protected regions 165 (e.g., enclaves), and a range of $2^{M-L}$ to $2^{M-L}+K^{TD}$ keys to be associated TDX domains, where TD is the number of "trust domains" that are supported. The secure extensions key may be understood to be an SGX key useable with the HC-EPC mode of the architecture. Trust domains are VMs required to be run with security guarantees of TDX. Such security guarantees may be implemented via security hardware and/or software to ensure that data stored in the memory 140 for each TD is private and inaccessible by another TD as well as by system software such as the OS or VMM. Different ranges of key IDs may be used to correspond to the various keys discussed above, so long as one key and corresponding key ID is exclusively reserved for encryption to/from secure enclaves (EPC).

Operation with HC-EPC, MK-TME, and SGX may be enabled and configured by BIOS firmware 150, upon boot of the computing system 100, using a TME capability (TME_CAPABILITY) (RO) MSR and a TME activate (TME_ACTIVATE) MSR within the MSRs 132 (FIG. 1B). The TME_CAPABILITY MSR may enumerate "N," the number of most significant bits in the physical address that can be used for key IDs. The TME_CAPABILITY MSR may also enumerate the number "K," or the number of key IDs that are available for software use, e.g., $2^{N-1}$ and key ID zero reserved for TME.

In implementations, to enable MK-TME, a TME Enable RWL bit in the TME_ACTIVATE MSR may be set and bits 35:32 are to have a non-zero value (which will specify the number of Key ID bits configured for MK-TME). These MK_TME_KEYID_BITS are the number of key ID bits (e.g., M bits less than or equal to the total N bits) to allocate to MK-TME usage. Similar to enumeration, this is an encoded value. The TME_ACTIVATE MSR may also be used to select L bits out of the M bits that may be used for TD key IDs (where L is less than or equal to M).

In implementations, writing a value for M greater than MK_TME_MAX_KEYID_BITS may result in general protection fault (#GP). Writing a non-zero value to this field may also result in a general protection fault if bit 1 of EAX (TME Enable) is not also set to '1,' as TME is to be enabled to use MK-TME. The TME_ACTIVATE MSR may also be used to lock other TME-related MSRs (e.g., EXCLUDE_MASK, EXCLUDE_BASE), so that any write to the MSRs after they are locked will be ignored. The lock may be reset when the computing system 100 is reset.

In implementations, when the computing device 100 is booted, the BIOS may store particular information in the TME_ACTIVATE MSR for later use by the processor 101 (e.g., including by the cryptographic engine 110 and/or the memory controller 120) in restricting access to the restricted encryption keys and key IDs. This information may include a bit range for a number of address bits of physical memory addresses (e.g., host physical addresses) used for key IDs. The particular information stored by BIOS into the TME_ACTIVATE MSR may further include a secure region key ID, which may be allocated for exclusive use to identify the secure extensions key programed into the cryptographic engine 110. Furthermore, in one implementation, an additional key ID may be stored in the TME_ACTIVATE MSR that identifies the last key ID to which TDX keys are allocated (e.g., $\text{Key}_{kTD}$). Key IDs that are beyond this number may be non-architecture key IDs use for a special purpose.

The computing device 100 may be embodied as any type of computation or computing device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. The computing device 100 may include other or additional components, such as those commonly found in a desktop computer (e.g., various input/output devices), in other implementations. Additionally, in some implementations, one or more of the illustrative components may be incorporated in, or otherwise form a portion of, another component. For example, the memory 140, or portions thereof, may be incorporated in the processor core in some implementations.

In implementations, a central processor unit (CPU) identifier leaf instruction (e.g., CPUID.SGX_LEAF) may be executed for the system software to enumerate the secure region key ID from among those key IDs enumerated for MK-TME and TDX. To execute the CPUID.SGX_LEAF instruction, the processor core 102 takes inputs from certain general purpose registers, executes the instructions, and returns to the system software hardware configuration information supplied by the BIOS. In a first execution of the CPUID.SGX_LEAF instruction with first register inputs, the software may enumerate the memory ranges that are convertible to secure pages as was configured by the BIOS. In a second execution of the CPUID.SGX_LEAF instruction with second register inputs, the software may enumerate the EPC key ID and other security properties associated with HC-EPC-based memory. The software may enumerate the key ID size via the TME_ACTIVATE MSR.

The hardware virtualization support circuit 116 (FIG. 1B) may support virtualized execution of operating systems, applications, and other software by the computing device 100. The hardware virtualization support circuit 116 may include virtual machine extensions (VMX) support by providing two modes of execution: VMX-root mode and VMX non-root mode. The VMX-root mode allows executing software to have broad control of the computing device 100 and its hardware resources. Conversely, a hypervisor, the VMM, or host operating system (OS) may execute in VMX-root mode. The VMX non-root mode restricts access to certain hardware instructions while still implementing the ordinary ring/privilege system of the processor core. One or more guest OSs (e.g., of the VMs 155) may execute in the VMX non-root mode. Those guest OSs may execute in ring zero, similar to being executed without virtualization. The hardware virtualization support circuit 116 may also support the extended page tables (EPT) 146, which may be embodied as hardware-assisted second-level page address translation. The hardware virtualization support circuit 116 may be embodied as, for example, Intel® VT-x technology.

The memory 140 may be embodied as any type of volatile or non-volatile memory or data storage capable of performing the functions described herein. In operation, the memory 140 may store various data and software used during operation of the computing device 100 such as operating systems, applications, programs, libraries, and drivers. The memory controller 120 may be coupled to the memory 140 to store to and fetch from the memory, which in some cases may depend on misses to the cache 112.

The secondary storage device 115 may be embodied as any type of device or devices configured for short-term or long-term storage of data such as, for example, memory devices and circuits, memory cards, hard disk drives, solid-state drives, or other data storage devices. In some implementations, the secondary storage device 115 may be used to store the contents of one or more secure regions. When stored by the secondary storage device 115, the contents of the secure region may be encrypted to prevent unauthorized access.

The communication circuitry 117 of the computing device 100 may be embodied as any communication circuit, device, or collection thereof, capable of enabling communications between the computing device 100 and other remote devices over a network. The communication circuitry 117 may be configured to use any one or more communication technology (e.g., wired or wireless communications) and associated protocols (e.g., Ethernet, Bluetooth®, Wi-Fi®, WiMAX, and the like) to effect such communication.

Figure 3:
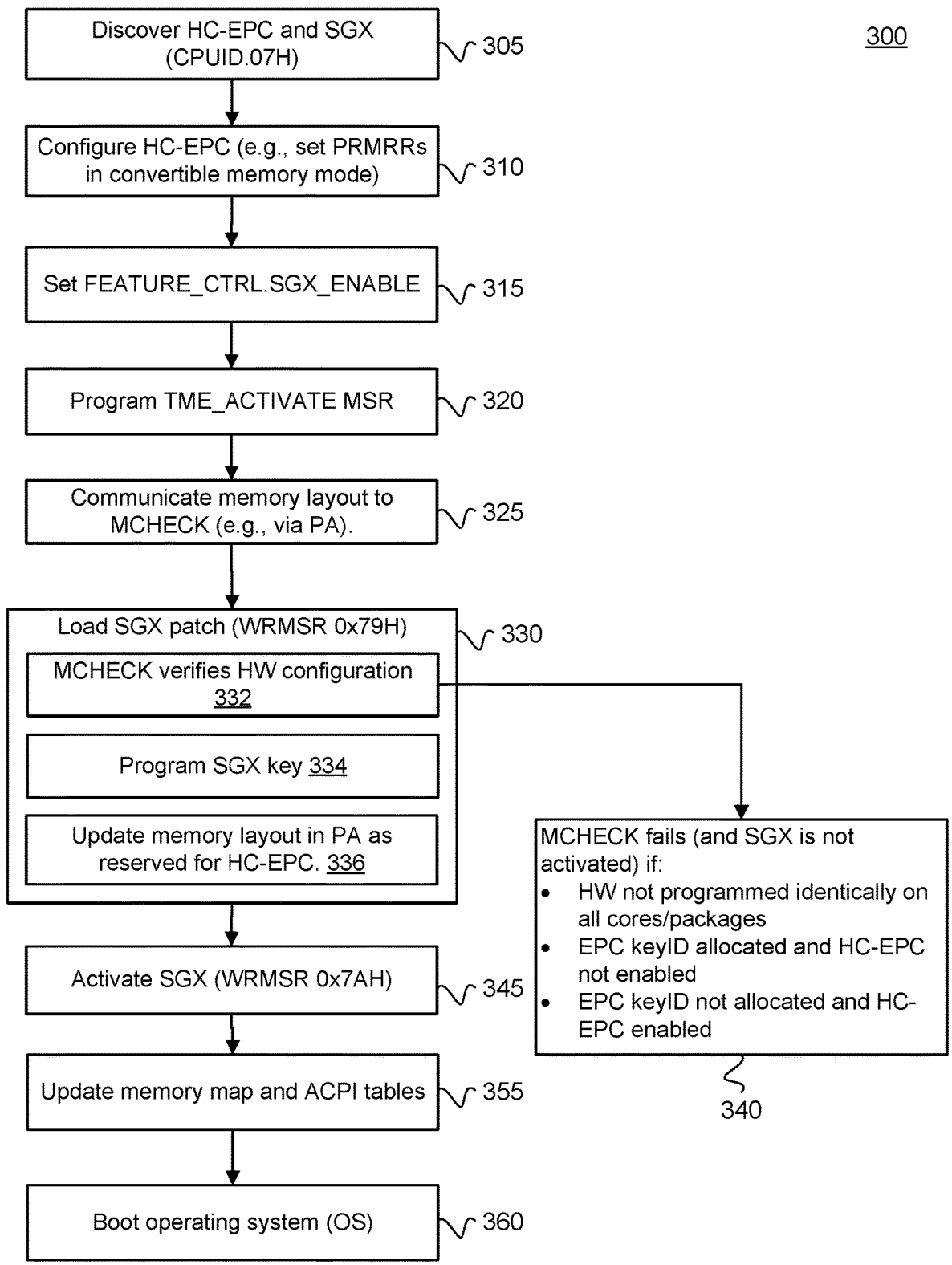
FIG. 3 is a flow chart of a method for initializing host-convertible secure regions in memory using MK-TMEi and secure guard extensions (SGX) according to implementations.

FIG. 3 is a flow chart of a method 300 for initializing host-convertible secure regions in memory using MK-TMEi and secure guard extensions (SGX) according to implementations. The method 300 may be performed by processing logic that may comprise hardware (e.g., circuitry, dedicated logic, programmable logic, microcode, etc.), firmware, or a combination thereof. In one implementation, method 300 is performed by processor 101 of FIG. 1A, e.g., by the BIOS firmware 150 and/or other firmware. In another implementation, the method 300 is performed by any of the processors described with respect to FIGS. 10A-16.

With reference to FIG. 3, the method 300 may begin by the processing logic discovering host-convertible secure region (e.g., HC-EPC) mode and the secure guard extensions mode (e.g., SGX) (305). The method 300 may continue with the processing logic configuring the host-convertible secure region architecture such as by setting one or more processor reserved memory range register (PRMRR), which may be numbered among the hardware registers 130 (310). The PRMRR may designate where EPC memory ranges and memory protection metadata are located. The host-convertible secure region mode may extend the use of the PRMRR to allow the PRMRR to be reconfigured or reprogrammed without rebooting the computing device 100. Upon being reprogrammed to support HC-EPC instruction set architecture, the PRMRR is herein renamed to flexible EPC domain range registers (FEDRR).

With continued reference to FIG. 3, the method 300 may continue with the processing logic setting a bit to enable SGX mode architecture, e.g., a FEATURE_CTRL. SGX_ENABLE bit (315). The method 300 may continue with the processing logic programming the TME_ACTIVATE MSR with key ID and other MK-TME and TDX-related information as discussed with reference to FIGS. 2A-2B (320). The method 300 may continue with the processing logic communicating the memory layout (e.g., ranges of reserved memory for EPC) to the MCHECK firmware 162 (325). The method 300 may continue with the processing logic loading a SGX patch-load instruction (e.g., using the WRMSR microcode 160) (330).

In various implementations, the BIOS firmware 150 initially programs the PRMRR to support protected memory management according to a static mode. Simultaneously, the BIOS may call the patch-load instruction, which starts a patch load by the processor core that allocates memory protection metadata (e.g., EPCM, BEPOCH (blocked EPOCH), memory encryption engine (MEE) tree, etc.) to be utilized in the HC-EPC mode. The BIOS may further store the final configuration for the FEDRR and memory map of reserved memory to hardware via pointers stored in the PA 169. This reserved memory may include memory holes such as memory mapped I/O (MMIO) and system management random access memory (SMRAM) and the like.

In implementations, these pointers includes a first pointer from BIOS to a patch/core reserved areas; a second pointer from BIOS to a patch/core host-convertible secure region ranges; and a third pointer from a patch/core to a BIOS reserved area. In the implementations, the first pointer points to memory addresses at which the BIOS stores sub-sets of memory ranges (of the memory 140) that are reserved areas and thus not available for conversion to secure pages. These sub-sets of memory ranges may be reserved for use by certain hardware or other I/O processes, for example, as will be discussed in more detail with reference to FIG. 4. The second pointer may point to memory addresses at which the BIOS stores sets of memory ranges (of the memory 140) that are delineated for conversion to secure pages (e.g., host-convertible secure region memory ranges), which is also discussed in more detail with reference to FIG. 4. These memory ranges may be delineated with a base and a mask of each memory reserved range, and may be accessible by the processor core.

The third pointer may point to memory addresses at which the processor core, in executing the patch-load instruction, may store a memory range reserved for code and data to be accessed by the BIOS. More specifically, the BIOS may store first information and second information to the PA 169 of the memory 140. The first information, for example, may delineate a memory range of the main memory allocable for flexible conversion to secure pages. The second information may delineate sub-sets of the memory range allocated for reserved memory, e.g., memory not flexibly convertible to secure pages. The BIOS 150 may also write other memory protection metadata for use by the processor core(s) 102 to implement a selected mode of protected memory management In implementations, a patch-load instruction is an instruction called by the BIOS to provide access to the PA 169 of the memory by the processor core. This data (useable by the BIOS) may include memory protection metadata that is to be used for protected memory management and allocated upon execution of the patch-load instruction. This memory range reserved to the BIOS may be treated similarly to hardware-reserved memory.

In various implementations, in execution of the patch load instruction, the method 300 may continue with the processing logic (e.g., MCHECK firmware 162) verifying the hardware configuration of the TME_ACTIVATE MSR and any PRMRRs (332). The method 300 may continue with the processing logic programming the secure extensions key (e.g., SGX key) that is to correspond to the secure region key ID 215 (FIG. 2B) (334). The method 300 may continue with the processing logic updating the memory layout in the PA 169 as reserved for the HC-EPC (336). In implementations, the MCHECK (or memory check) process fails and secure guard extensions (SGX) is not activated if any of the following hold true, namely (1) the processor hardware is not programmed identically on all processor cores and packages of the multi-core processor 101; (2) the secure region key ID is allocated yet HC-EPC mode is not enabled; and (3) the secure region key ID is not allocated where the HC-EPC mode is enabled (340).

With continued reference to FIG. 3, the method 300 may continue with the processing logic activating SGX via the WRMSR microcode 160 (345). The method 300 may continue with the processing logic updating the memory map (e.g., to reflect the configuration of the reserved and host-convertible EPC pages) and Advanced Configuration and Power Interface (ACPI) tables (355). The method 300 may continue with the processing logic fully booting the operating system (OS) (360).

Figure 4:
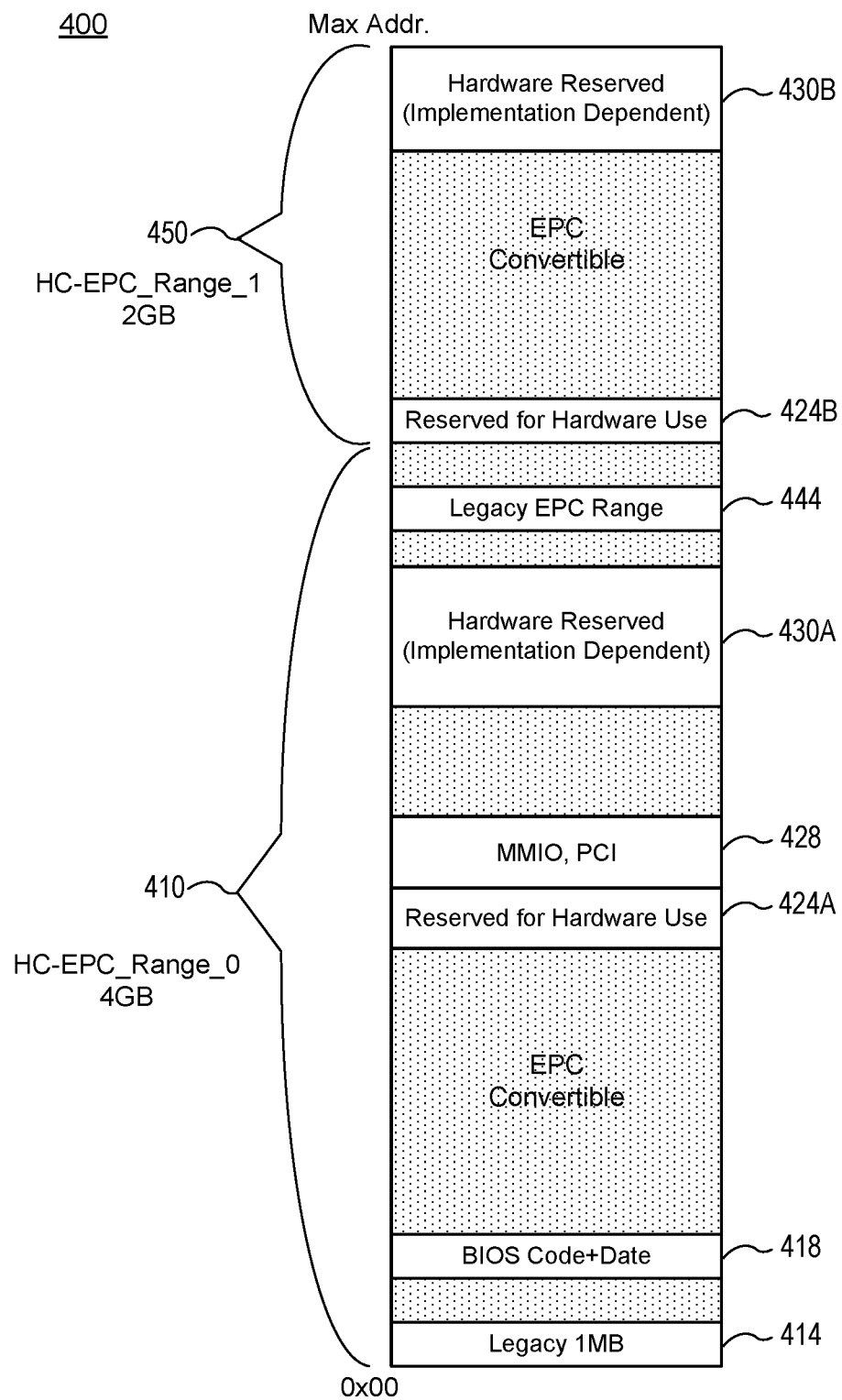
FIG. 4 is a memory diagram illustrating different ranges of memory allocable for conversion to secure pages and reserved memory that is not allocable for such conversion, according to implementations.

FIG. 4 is a memory diagram 400 illustrating different ranges of memory allocable for conversion to secure pages and reserved memory that is not allocable for such conversion, according to implementations of the disclosure. The memory diagram 400 illustrates a portion of the main memory 140 according to various implementations. In HC-EPC mode, the BIOS firmware 150 may set up a memory map that includes a first flexible secure region memory range 410, which is 4 GB large, and a second flexible secure region memory range 450, which is 2 GB large, so these memory ranges may vary.

According to various implementations, while the first flexible secure region memory range 410 may generally be convertible to secure pages (the "EPC convertible" sections), there are a number of memory reserved sections such as those discussed previously. More specifically, those memory reserved sections may include a legacy 1 MB section 414, a BIOS code and data section 418, a hardware-reserved section 424A, a memory holes section 428, and an implementation-dependent, hardware-reserved section 430A. A legacy EPC range 444 may be the statically-allocated memory range that supports static mode of secure pages. Once the FEDRR is reprogrammed, the legacy EPC range 444 may be convertible to secure pages.

According to various implementations, while the second flexible secure region memory range 450 may also be generally convertible to secure pages, there is also hardware reserved memory. The hardware reserved memory may include a hardware-reserved section 424B and implementation-dependent, hardware-reserved section 430B. The memory sections 424A, 424B, 430A, and 430B may be reserved for hardware use and are thus not convertible to secure pages.

When the computing device 100 is in unlocked mode or gets locked in static mode, the PRMRR may behave in accordance with static (e.g., legacy) secure pages operation. In that case, executing of the write-to-model-specific-register (WRMSR) instruction may check for overlaps with system management range registers (SMRR) or advance programmable interrupt controller (APIC) pages, for example.

When the computing device 100 gets locked in HC-EPC mode, as discussed, the processing core 102 may reprogram the PRMRR according to the FEDRR configuration passed by the BIOS via the predetermined area (PA) 169 of the memory 140. As the intention is that the FEDRR covers the entire physical memory, WRMSR instructions may stop checking for overlaps with SMRR and APIC pages (which was the legacy activity of WRMSR because memory inside the SMRR area and APIC page cannot be used for secure regions). From this point on, memory designated in the FEDRR is available to the OS (except for memory that is reserved by BIOS) and can be converted to enclave page cache (EPC) via secure region conversion instruction, EMKEPC, and back to non-EPC via non-secure conversion instruction, EMKNONEPC, of which both may be in the form of secure instructions or of secure functions of enclave (ENCLS) leaf instructions (such as the ENCLS supervisor instruction).

In various implementations, the processor core 112 may use a bit in the PRMRR, or some other MSR included in the registers hardware registers 130, to recognize whether the PRMRR is in static mode or in FEPC mode, and applies the appropriate access control mechanism according to the mode of secure pages. The BIOS firmware 150 may create the final FEDRR configuration to cover the physical memory of the HC-EPC mode.

Accordingly, the computing device 100 may configure several FEDRRs in order to set up memory maps of the entire physical memory. For example, it is possible that a client computer system may configure two or more FEDRRs while a server computer system may configure up to 16 FEDRRs (or more) to effectively cover envisioned memory configurations. For example, each local socket may call for a separate FEDRR.

Although memory sizes are not always power of two, a FEDRR may be set up as per a power of two as related to memory size of the main memory 140. This means that the BIOS 150 may size FEDRRs to overlap memory holes created when a FEDRR is larger than the size of available memory. However, the patch-load instruction, once executed, may allocate enclave page metadata (EPCM) entries that completely cover the FEDRR. The BIOS 130 may pass memory hole information via the PA 169 to the patch-load mechanism so that EPCM entries that cover memory holes can be initialized to indicate that they are not convertible to secure pages.

For example, FIG. 4 illustrates one example layout of FEDRRs on a client computer system before HC-EPC mode activation. When the HC-EPC mode is activated, FEDRR_0 may be reconfigured according to HC-EPC_Range_0 configuration (the first flexible secure region memory range 410) and FEDRR_1 according to HC-EPC_Range_1 (the second flexible secure region memory range 450). The memory in the original PRMRR_0, which corresponds to the legacy EPC range 444, becomes convertible and can be used as-is because this memory has not been accessed before HC-EPC mode activation, for example.

Figure 5:
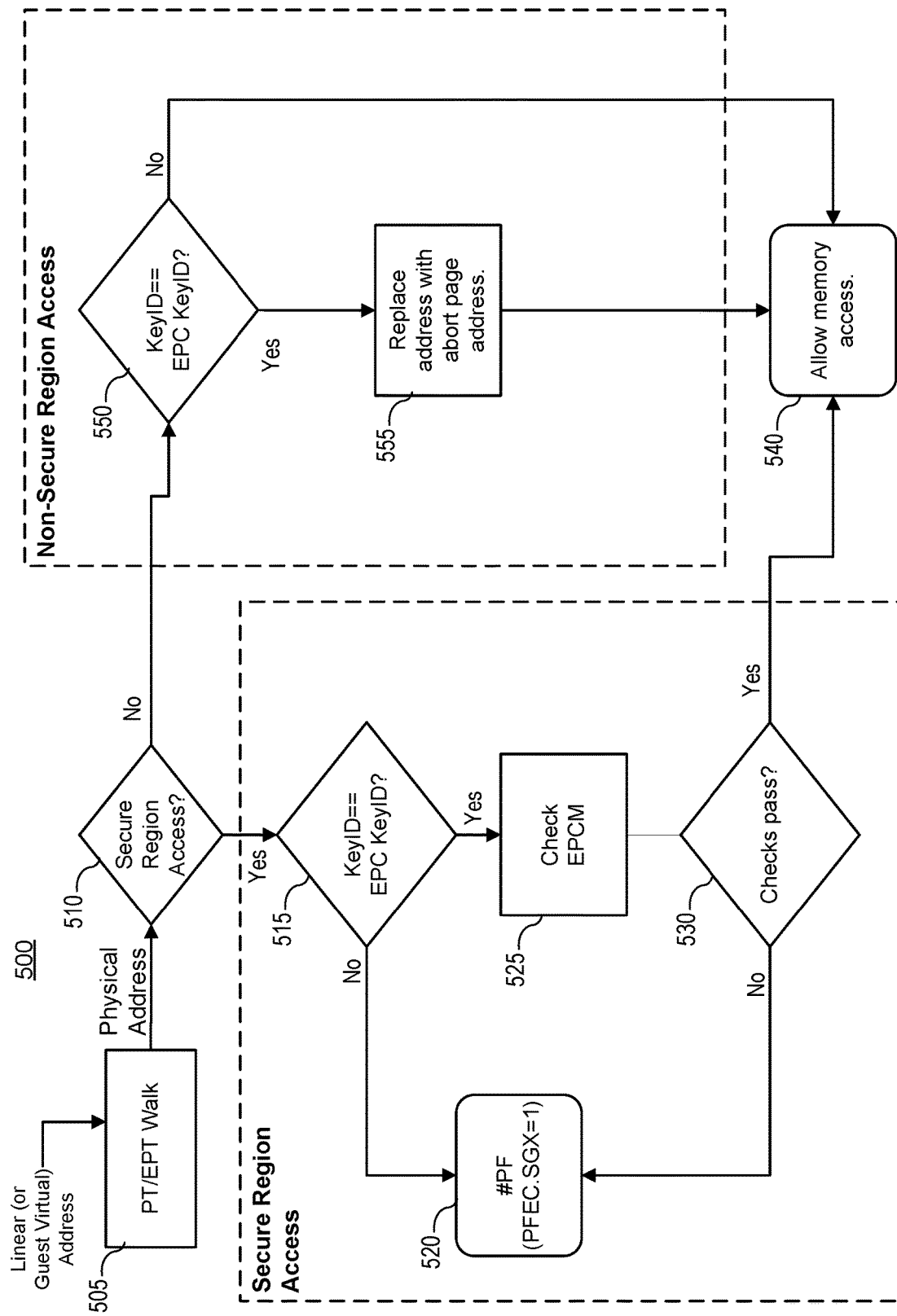
FIG. 5 is a flow chart of a method for host-convertible secure regions access control, according to implementations.

FIG. 5 is a flow chart of a method 500 for host-convertible secure regions access control by the processor core 102 of FIGS. 1A and 1B, according to implementations. The method 500 may be performed by processing logic that may comprise hardware (e.g., circuitry, dedicated logic, programmable logic, microcode, etc.), firmware, or a combination thereof. In one implementation, method 500 is performed by the processor 101 of FIG. 1A, e.g., by one or more of the processor core(s) 102.

In the various implementations, the method 500 may begin with the processing logic receiving a linear address for a cache line in the memory 140, e.g., as part of a request to access the memory 140, which may be translated into a guest virtual address (GVA). The method 500 may continue with the processing logic invoking address translation, including performing page table and extended page table (EPT) walks, to translate the GVA to a physical address (PA) of the memory 140 (505). The method 500 may continue with the processing logic determining whether the physical address indicates the request is for secure region access, e.g., to access a first secure region of the EPC within the memory 140 (510). For example, memory access may be of two types. A first type is an enclave access to a linear address that corresponds to a memory range that falls within the architecturally-protected memory regions of the memory 140. A second type is a non-enclave access to a linear address that corresponds to memory outside of such memory range(s).

With continued reference to FIG. 5, the method 500 may continue with the processing logic determining whether the key ID located in the physical address matches the enclave key ID (also referred to as EPC key ID herein), and thus corresponds to a secure page in the architecturally-protected memory regions (e.g., protected regions 165 in FIG. 1A) (515). In one scenario, the processing logic determines that a first key ID located within the physical address does not match the secure region key ID. Accordingly, the method 500 may continue with the processing logic issuing a page fault and denying access, by a system agent that issued the request for the memory access, to the secure page in the memory 140 (520).

With reference again to block 515 of FIG. 5, in another scenario, the processing logic determines that the first key ID located within the physical address does match the secure region key ID (515). According, the method 500 may continue with the processing logic checking the metadata of the EPCM 126 to perform security checks regarding secure page ownership, that the system agent is authorized to access the secure page of certain type, and enforcing that one secure region does not access secure pages of another secure region, among other checks (525). The method 500 may continue with the processing logic determining whether the EPCM-based checks have passed (530). If not, the method 500 may continue with the processing logic generating a page fault and denying access to the secure page in the memory (520). If yes, the method 500 may continue with the processing logic allowing the memory access by the system agent (540).

With continued reference to FIG. 5, in response to determining that the physical address is associated with a non-secure page at block 510, the method 500 may continue with the processing logic determining whether the first key ID located in the physical address matches the secure region key ID, and thus corresponds to an secure page in the architecturally-protected memory regions (e.g., protected regions 165 in FIG. 1A) (550). If no, then the method 500 may continue with the processing logic allowing the memory access due to the fact that the memory being accessed is properly non-secure memory (540). If yes, the first key ID and the secure region key ID match, then the method 500 may continue with the processing logic denying access, by the system agent that issued the request, to the non-secure page of the memory. In one implementation, this may be performed by replacing the physical address in the request with an abort page address (555). The abort page address may link to an abort page containing incorrect data, such as all zero values or all one values. The method 500 may continue with the processing logic allowing access to the abort memory page (540).

Figure 6:
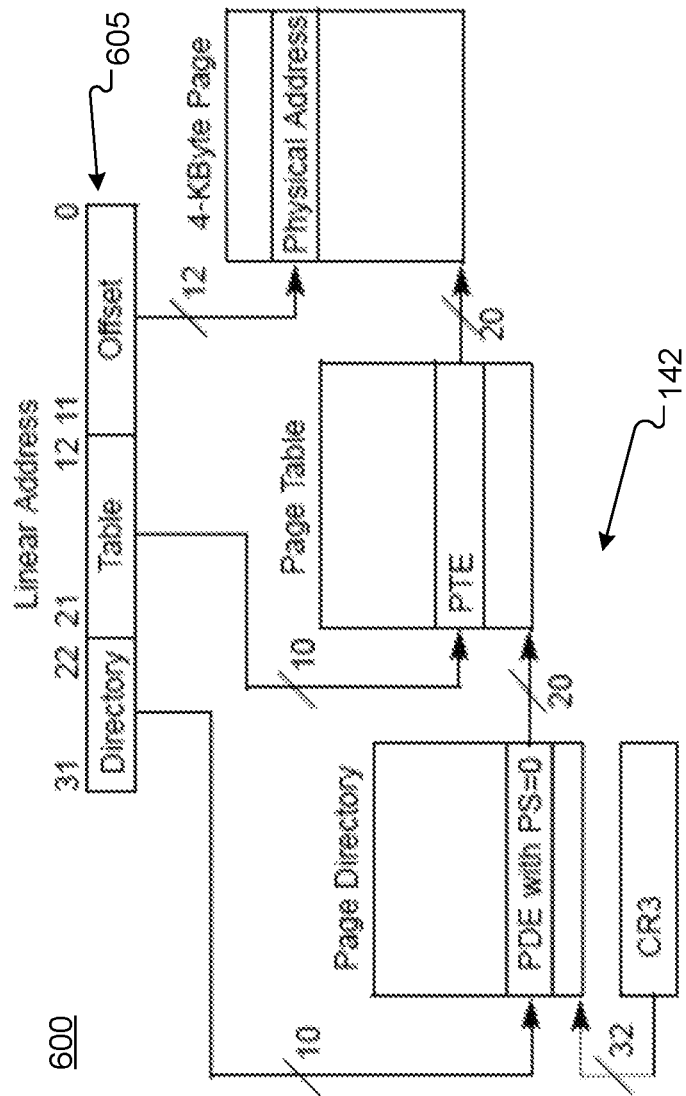
FIG. 6 is a block diagram of pages tables associated with translation of a linear address to a physical memory address using paging, according to an implementation.

FIG. 6 is a block diagram 600 of the pages tables 142 associated with translation of a linear address 605 to a physical memory address (PA) using paging according to an implementation. Paging supports a virtual memory environment where a large linear address space is simulated with a small amount of physical memory (RAM and ROM) and some disk storage. When using paging, each segment is divided into pages (e.g., 4 KB each in size), which are stored either in the memory 140 or on disk, e.g., the secondary storage 115. The operating system and/or the memory controller 120 can maintain a page directory and a set of page tables to keep track of the pages. When a program (or task) attempts to access an address location in the linear address space, the memory controller 120 may use the page directory and page tables to translate the linear address 605 into a physical address and then performs the requested operation (read or write) on the memory location.

If the page being accessed is not currently in physical memory, the processor interrupts execution of the program (by generating a page-fault exception). The memory controller 120 may then read the page into physical memory from the disk and continues executing the program.

With continued reference to FIG. 6, the linear address 605 may be partitioned into page directory (PDE) bits, page table bits, and an offset. The PDE bits may act as a pointer into a page directory table (PDT) located via one of the bits in the CR3 control register. The address to which the PDE bits point within the PDT table may then act as a pointer to locate the correct page table in memory. The page table bits point to a page table entry (PTE) within the located page table. The PTE may then act as a pointer to the address of the correct 4-Kbte page in memory within which the offset points to the physical memory address. In implementations, the processor core 102 (e.g., system software executing on the professor core 102) incorporates the secure region key ID within mappings to the physical address of the page tables 142 for a secure page in the memory 140. In one implementation, the upper bits in page-table entries contain the secure region key ID.

Figure 7A:
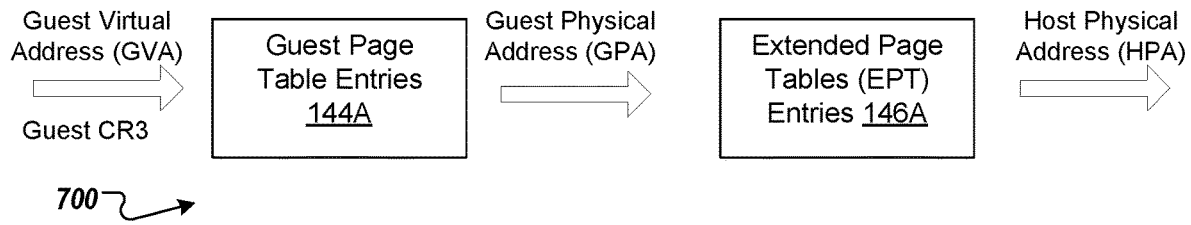
FIG. 7A is a block diagram illustrating translation of a guest virtual address to a guest physical address and of a guest physical address to a host physical address, according to an implementation.

FIG. 7A is a block diagram 700 illustrating translation of a guest virtual address (GVA) to a guest physical address (GPA) and of the GPA to a host physical address (HPA) or a physical memory address, according to an implementation. In one implementation, in order to emulate an instruction on behalf of a VM, the VMM 104A may need to translate a linear address (e.g., a GVA) used by the instruction to a physical memory address such that the VMM can access data at that physical address. As discussed, the VMM may also gain access to an appended key ID without the safeguards put in place.

In order to perform that translation, the VMM may need to first determine paging and segmentation including examining a segmentation state of the virtual machine (VM) 155. The VMM may also determine a paging mode of the VM 155 at the time of instruction invocation, including examining page tables set up by the VM and examining the control registers 134 and MSRs programmed by the VM 155. Following discovery of paging and segmentation modes, the VMM may generate a GVA for a logical address, and detect any segmentation faults.

Assuming no segmentation faults are detected, the VMM may translate the GVA to a GPA and the GPA to an HPA, including performing a page table and EPT walk in software. To perform these translations in software, the VMM may load a number of paging structure entries and EPT structure entries originally set up by the VM 155 into general purpose registers or memory. Once these paging and EPT structure entries are loaded, a page miss-handler (PMH) 122 circuit may perform the translations by modeling translation circuitry.

More specifically, with reference to FIG. 7A, the PMH 122 may be programmed with a guest page table pointer and an EPT pointer from a virtual machine control structure (VMCS) (stored in the memory 140) when the VMM performs a VMRESUME that uses that VMCS. The PMH 122 may load a plurality of guest page table entries 144A from the guest page tables 142 and a plurality of extended page table entries 146A from the EPT 134 that were established by the VM 155. The PMH 122 may then perform translation by walking (e.g., sequentially searching) through the guest page table entries 144A to generate a GPA from the GVA. The PMH 122 may then use the GPA to walk (e.g., sequentially search) the EPT 146 to generate the HPA associated with the GPA. Use of the EPT 146 is a feature that can be used to support the virtualization of physical memory. When EPT is in use, certain addresses that would normally be treated as physical addresses (and used to access memory) are instead treated as guest-physical addresses. Guest-physical addresses are translated by traversing a set of EPT paging structures to produce physical addresses that are used to access physical memory. In implementations, the processor core 102 (e.g., system software executing on the professor core 102) incorporates the secure region key ID within the mappings to the physical address of the page tables 142 and/or extended page tables (EPT) 146 for a secure page in the memory 140. In one implementation, the upper bits in page-table entries and extended-page-table entries contain the secure region key ID.

Figure 7B:
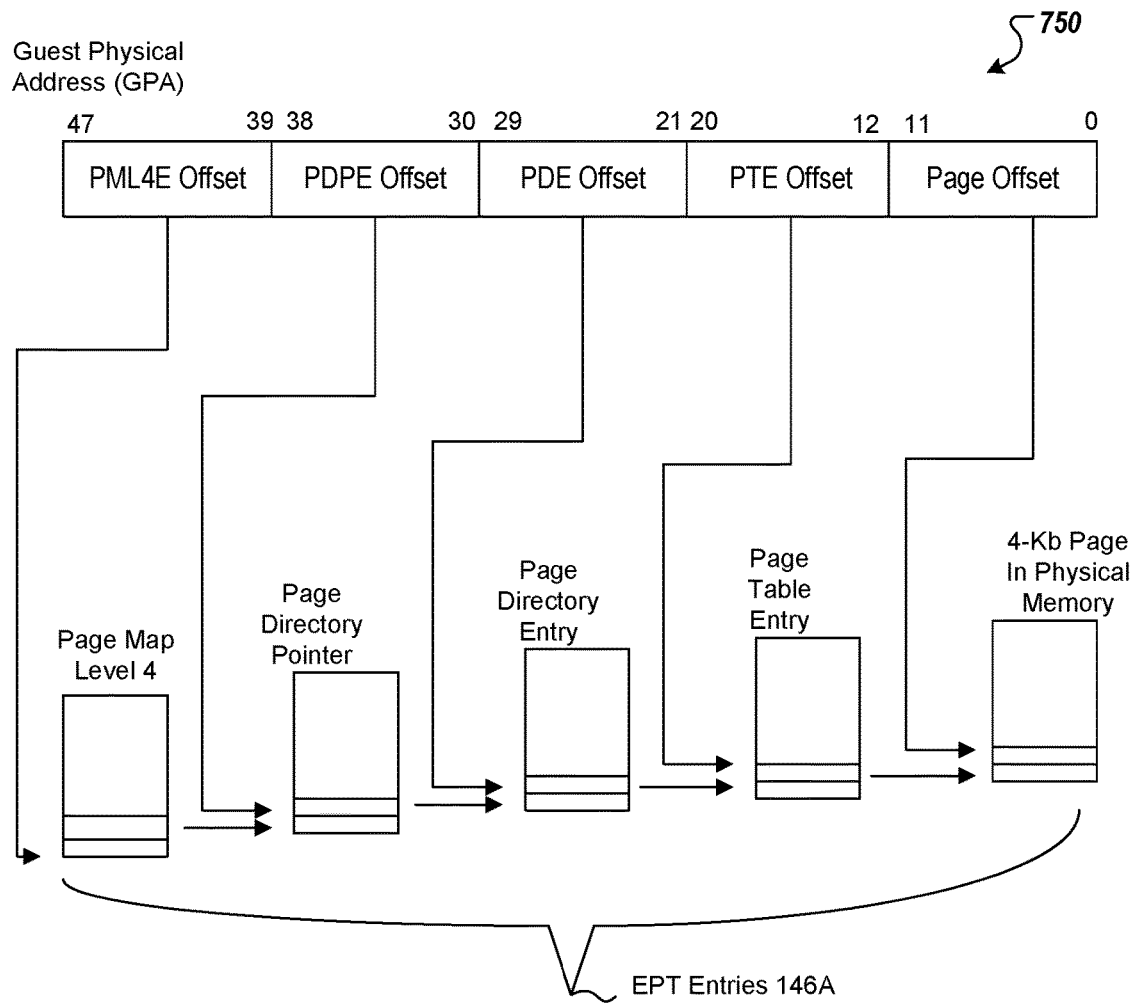
FIG. 7B is a block diagram illustrating use of extended page tables (EPT) to translate a guest physical address to the host physical address, according to an implementation.

FIG. 7B is a block diagram 750 illustrating use of extended page tables (EPT) to translate the guest physical address (GPA) to the host physical address (HPA), according to an implementation. For example, the VMM 104A or the PMH 122 may walk the extended page table (EPT) entries 146A to translate a GPA to an HPA, according to one implementation. For example, the guest physical address (GPA) may be broken into a series of offsets, each to index within a table structure of a hierarchy of the EPT entries 146A. In this example, the EPT from which the EPT entries are derived includes a four-level hierarchal table of entries, including a page map level 4 table, a page directory pointer table, a page directory entry table, and a page table entry table. (In other embodiments, a different number of levels of hierarchy may exist within the EPT, and therefore, the disclosed embodiments are not to be limited by a particular implementation of the EPT.) A result of each index at a level of the EPT hierarchy may be added to the offset for the next table to locate a next result of the next level table in the EPT hierarchy. The result of the fourth (page table entry) table may be combined with a page offset to locate a 4 Kb page (for example) in physical memory, which is the host physical address.

Figure 8:
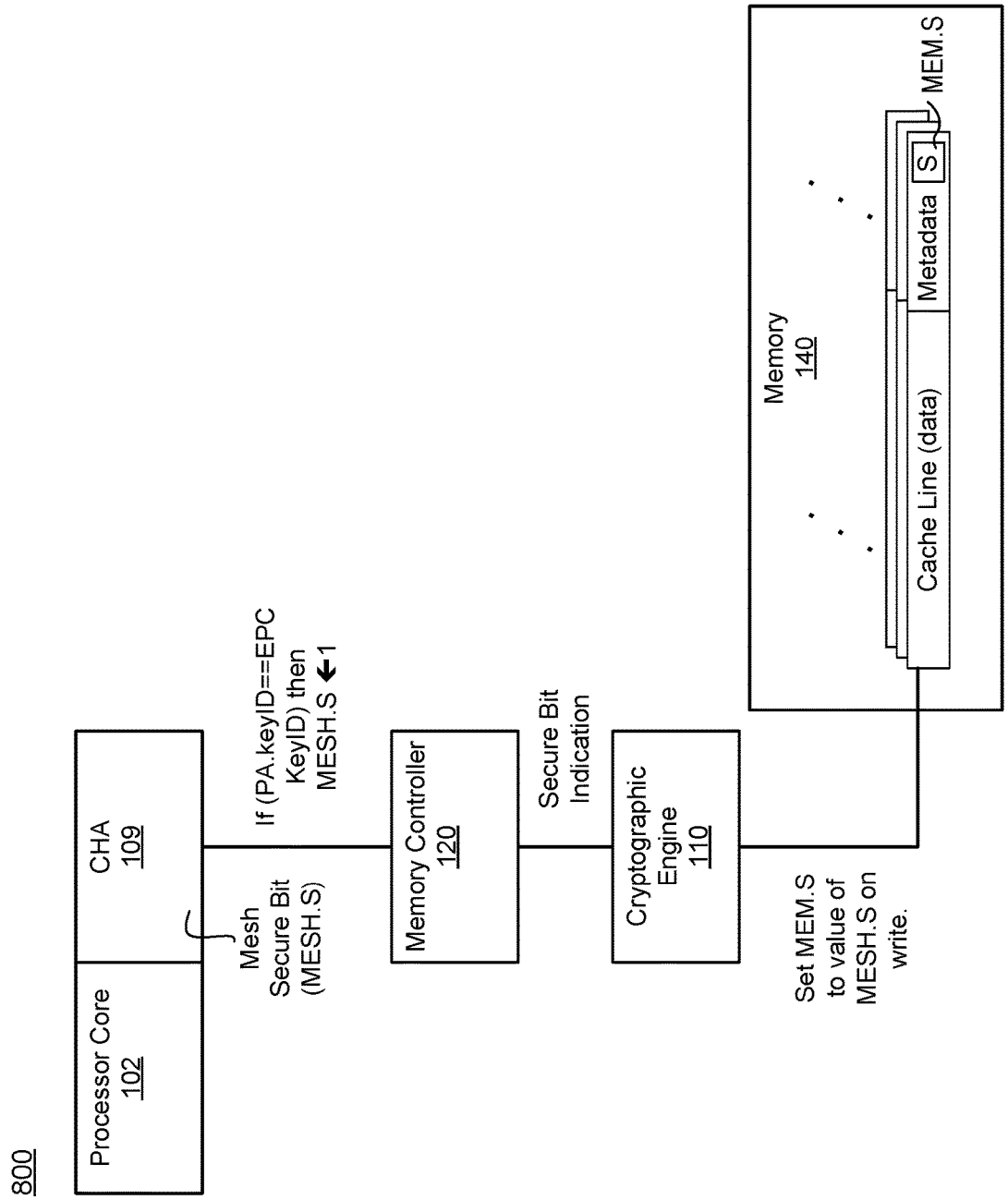
FIG. 8 is functional flow diagram illustrating use of a mesh secure bit and a memory secure bit by a cryptographic engine as a security check with reference to secure region memory operations, according to one implementation.

FIG. 8 is functional flow diagram 800 illustrating use of a mesh secure bit and a memory secure bit by the cryptographic engine 110 as a security check with reference to secure region memory operations, according to one implementation. In the implementation, the CHA 109 of a memory subsystem sets a mesh secure bit (MESH.S) of a cache line in response to detection that a first key identifier (ID) in a physical address of the cache line matches the secure region key ID. The CHA 109 may further issue a write operation to the memory 140 for the cache line, which has a location identified by the PA in the memory operation request. In implementations, the cryptographic engine 110 is coupled to the CHA and is to set a memory secure bit (MEM.S), which resides in metadata of the cache line in the memory, to a value of the mesh secure bit (MESH. S) as part of completion of the write operation.

With further reference to FIG. 8, the cryptographic engine 110 may further detect a read operation directed to the cache line stored in the memory. The cryptographic engine 110 may, to fulfill the read operation, return a poison bit to a requesting agent in response to detection of a mismatch between values of mesh secure bit (MESH. S) and memory secure bit (MEM.S). In addition to the poison bit, the cryptographic engine 110 may also return a fixed pattern of data to the requesting agent. Similarly, the cryptographic engine 100 may, to fulfill the read operation, return data of the cache line to a requesting agent in response to a determination that values of the mesh secure bit (MESH. S) and the memory secure bit (MEM.S) match. Table 1 illustrates a summary of these actions depending on respective values of the mesh secure bit (MESH. S) and the memory secure bit (MEM.S).

TABLE 1

| MESH.S | MEM.S | Read Returns |
|--------|-------|--------------|
| 0 | 0 | Data as normal |
| 0 | 1 | Fixed pattern (as data) and poison bit |
| 1 | 0 | Fixed pattern (as data) and poison bit |
| 1 | 1 | Data as normal |

Figure 9A:
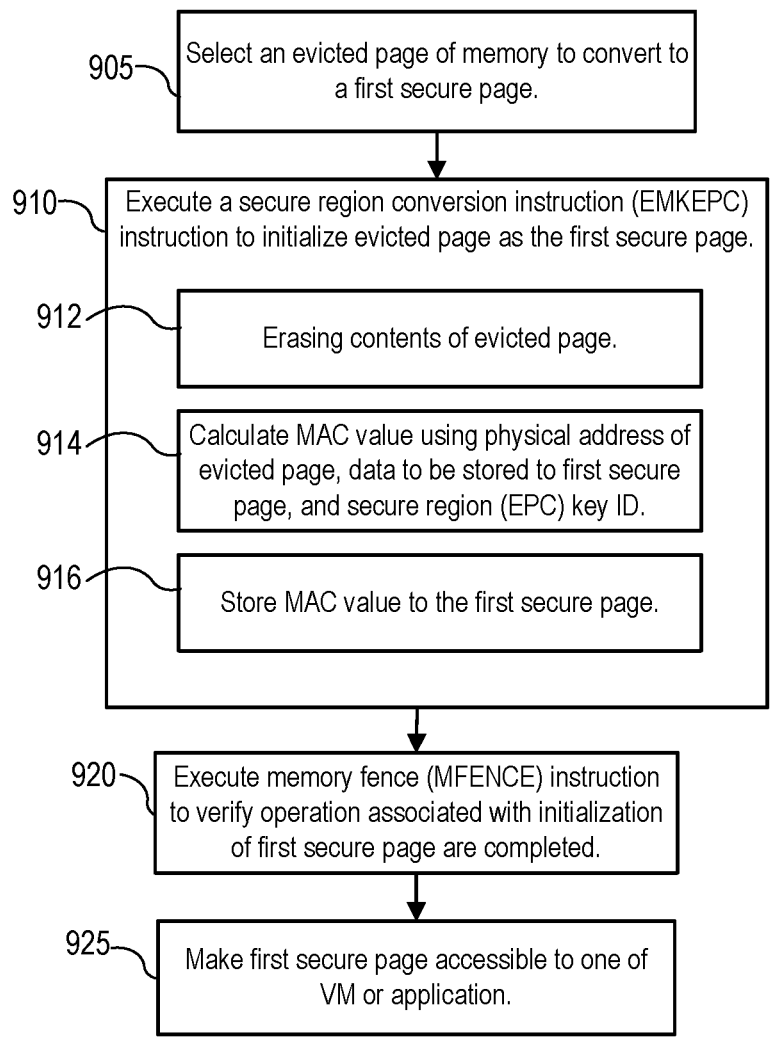
FIG. 9A is a flow chart of a method for assigning an evicted memory page to a secure region key ID, according to implementations.

FIG. 9A is a flow chart of a method 900 for assigning an evicted memory page to a secure region key ID, according to implementations. The method 900 may be performed by processing logic that may comprise hardware (e.g., circuitry, dedicated logic, programmable logic, microcode, etc.), firmware, or a combination thereof. In one implementation, method 900 is performed by the processor 101 of FIG. 1A, to include, in one implementation, by system software executing on the one or more processor cores 102.

With reference to FIG. 9A, the method 900 may begin with the processing logic selecting an evicted page of memory to convert to a first secure page (905). The method 900 may continue with the processing logic executing a secure region (e.g., enclave) conversion instruction (EMKEPC) to initialize the evicted page as the first secure page (910). To initialize the evicted page may include the method 900 continuing with the processing logic writing all zeros as content of the evicted page (912), calculating a new message authentication code (MAC) value using a physical address of the evicted page, data to be stored to the first secure page, and a secure region key identifier (ID) corresponding to an architecturally-protected memory region of the memory containing the first secure page (914), and storing the MAC value to the first secure page (916).

In one implementation, the EMKEPC instruction may trigger performance of a MOVDIR64B instruction having, within an operand, the secure region key ID, which is to zero out the target page and initialize MAC values for the new secure page. This may be because the MOVDIR64B is capable of initializing MAC values for new secure pages, where system software is not capable of such initialization.

With continued reference to FIG. 9A, the method 900 may continue with the processing logic executing a memory fence (MFENCE) instruction to verify operations associated with initialization of the first secure page are completed (920). The method 900 may continue with the processing logic making the first secure page accessible to one of a virtual machine or an application authorized to access the architecturally-protected memory region of the memory.

Figure 9B:
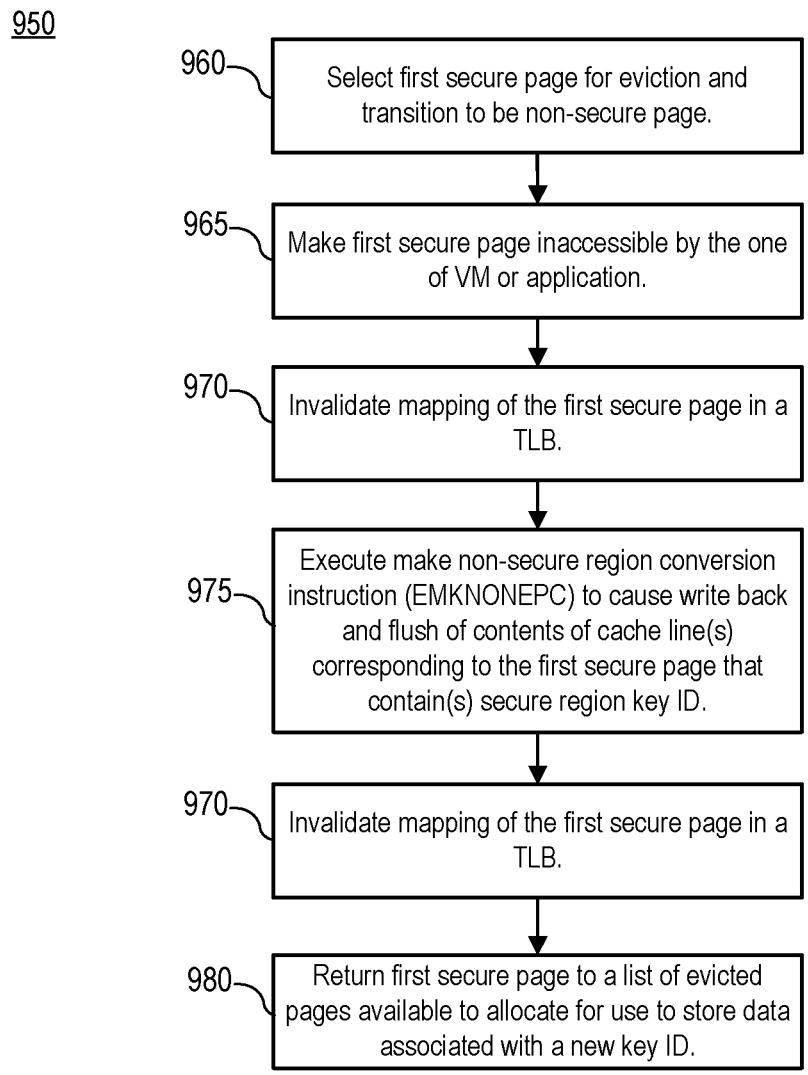
FIG. 9B is a flow chart of a method for eviction of a secure page in memory for reassignment to a non-secure region key ID, according to implementations.

FIG. 9B is a flow chart of a method 950 for eviction of a secure page in memory for reassignment to a non-secure region key ID, according to implementations. The method 900 may be performed by processing logic that may comprise hardware (e.g., circuitry, dedicated logic, programmable logic, microcode, etc.), firmware, or a combination thereof. In one implementation, method 950 is performed by the processor 101 of FIG. 1A, to include, in one implementation, by system software executing on the one or more processor cores 102.

With reference to FIG. 9B, the method 950 may begin with the processing logic selecting the first secure page for eviction and transition to be a non-secure page (960). The method 950 may continue with the processing logic making the first secure page inaccessible by one of a virtual machine or an application authorized to access the architecturally-protected memory region of the memory (965). The method 950 may continue with the processing logic invalidating mappings of the first secure page in a translation lookaside buffer (TLB) of the processor (975). For example, the processor core of FIG. 10A illustrates data TLB units in which the map mapping may be invalidated.

With additional reference to FIG. 9B, the method 950 may continue with the processing logic executing a non-secure region conversion instruction (EMKNONEPC) to cause write back (to the memory 140) and flush of contents of one or more cache line, corresponding to the first secure page, that contains the secure region key ID (975). To do the write back and flush, in one implementation, the EMKNONEPC instruction may trigger execution of a cacheline flush (CLFLUSH) instruction using a linear address that translates to a physical address with the secure region key ID. The method 950 may continue with the processing logic returning the first secure page to a list of evicted pages available to the processor 101 to allocate for use to store data associated with a new key ID (980).

FIG. 10A is a block diagram illustrating a micro-architecture for a processor 1000 that implements hardware support for restricting usage of encryption keys by untrusted software, according to an implementation. Specifically, processor 1000 depicts an in-order architecture core and a register renaming logic, out-of-order issue/execution logic to be included in a processor according to at least one implementation of the disclosure.

Processor 1000 includes a front end unit 1030 coupled to an execution engine unit 1050, and both are coupled to a memory unit 1070. The processor 1000 may include a reduced instruction set computing (RISC) core, a complex instruction set computing (CISC) core, a very long instruction word (VLIW) core, or a hybrid or alternative core type. As yet another option, processor 1000 may include a special-purpose core, such as, for example, a network or communication core, compression engine, graphics core, or the like.

In one implementation, processor 1000 may be a multi-core processor or may be part of a multiprocessor system.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 1040 may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different scheduler circuits, including reservations stations (RS), central instruction window, etc. The scheduler unit(s) 1056 is coupled to the physical register set(s) unit(s) 1058. Each of the physical register set(s) units 1058 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 1058 is overlapped by the retirement unit 1054 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register set(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 1056, physical register set(s) unit(s) 1058, and execution cluster(s) 1060 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which may include a data prefetcher 1080, a data TLB unit 1072, a data cache unit (DCU) 1074, and a level 2 (L2) cache unit 1076, to name a few examples. In some implementations DCU 1074 is also known as a first level data cache (L1 cache). The DCU 1074 may handle multiple outstanding cache misses and continue to service incoming stores and loads. It also supports maintaining cache coherency. The data TLB unit 1072 is a cache used to improve virtual address translation speed by mapping virtual and physical address spaces. In one exemplary implementation, the memory access units 1064 may include a load unit, a store address unit, and a store data unit, each of which is coupled to the data TLB unit 1072 in the memory unit 1070. The L2 cache unit 1076 may be coupled to one or more other levels of cache and eventually to a main memory.

In one implementation, the data prefetcher 1080 speculatively loads/prefetches data to the DCU 1074 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1000 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 10B is a block diagram illustrating an in-order pipeline and a register renaming stage, out-of-order issue/execution pipeline implemented by processor 1000 of FIG. 10A according to some implementations of the disclosure. The solid lined boxes in FIG. 10B illustrate an in-order pipeline 1001, while the dashed lined boxes illustrate a register renaming, out-of-order issue/execution pipeline 1003. In FIG. 10B, the pipelines 1001 and 1003 include a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1020, and a commit stage 1022. In some implementations, the ordering of stages 1002-1024 may be different than illustrated and are not limited to the specific ordering shown in FIG. 10B.

Figure 11:
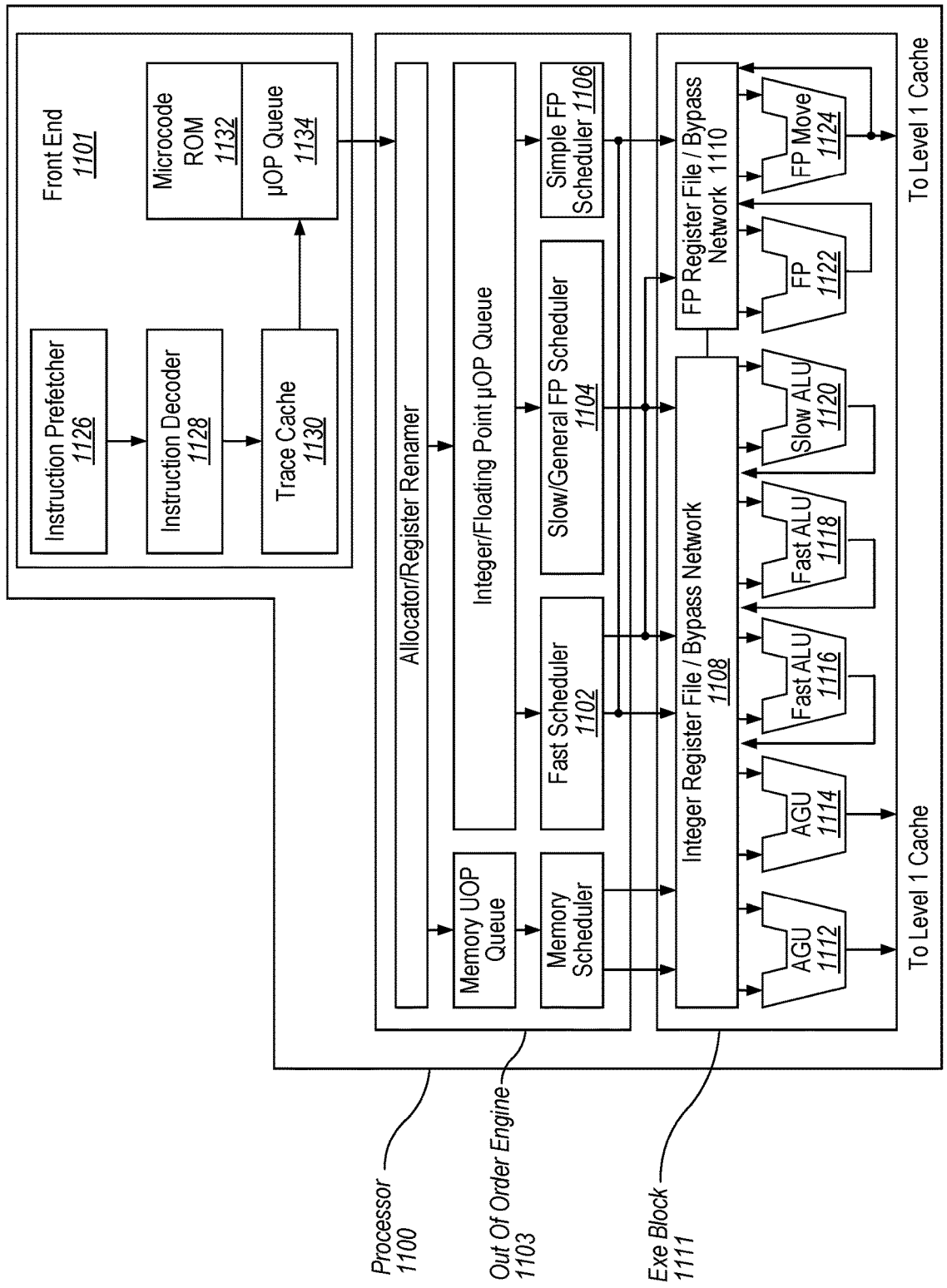
FIG. 11 illustrates a block diagram of the micro-architecture for a processor or an integrated circuit that implements hardware support for a multi-key cryptographic engine, according to an implementation of the disclosure.

FIG. 11 illustrates a block diagram of the micro-architecture for a processor 1100 that includes logic circuits of a processor or an integrated circuit that implements hardware support for restricting usage of encryption keys by untrusted software, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 1101 is the part of the processor 1100 that fetches instructions to be executed and prepares them to be used later in the processor pipeline. The implementations of the page additions and content copying can be implemented in processor 1100.

The front end 1101 may include several units. In one implementation, the instruction prefetcher 1126 fetches instructions from memory and feeds them to an instruction decoder 1128 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 1130 takes decoded uops and assembles them into program ordered sequences or traces in the uop queue 1134 for execution. When the trace cache 1130 encounters a complex instruction, microcode ROM (or RAM) 1132 provides the uops needed to complete the operation.

Some instructions are converted into a single micro-op, whereas others need several micro-ops to complete the full operation. In one implementation, if more than four micro-ops are needed to complete an instruction, the instruction decoder 1128 accesses the microcode ROM 1132 to do the instruction. For one implementation, an instruction can be decoded into a small number of micro ops for processing at the instruction decoder 1128. In another implementation, an instruction can be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one implementation from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one implementation can schedule on each half of the main clock cycle while the other schedulers can only schedule once per main processor clock cycle. The schedulers arbitrate for the dispatch ports to schedule uops for execution.

Register sets 1108, 1110, sit between the schedulers 1102, 1104, 1106, and the execution units 1112, 1114, 1116, 1118, 1120, 1122, 1124 in the execution block 1111. There is a separate register set 1108, 1110, for integer and floating point operations, respectively. Each register set 1108, 1110, of one implementation also includes a bypass network that can bypass or forward just completed results that have not yet been written into the register set to new dependent uops. The integer register set 1108 and the floating point register set 1110 are also capable of communicating data with the other. For one implementation, the integer register set 1108 is split into two separate register sets, one register set for the low order 32 bits of data and a second register set for the high order 32 bits of data. The floating point register set 1110 of one implementation has 128 bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register sets 1108, 1110, that store the integer and floating point data operand values that the micro-instructions need to execute. The processor 1100 of one implementation is comprised of a number of execution units: address generation unit (AGU) 1112, AGU 1114, fast ALU 1116, fast ALU 1118, slow ALU 1120, floating point ALU 1112, floating point move unit 1114. For one implementation, the floating point execution blocks 1112, 1114, execute floating point, MMX, SIMD, and SSE, or other operations. The floating point ALU 1112 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 1116, 1118. The fast ALUs 1116, 1118, of one implementation can execute fast operations with an effective latency of half a clock cycle. For one implementation, most complex integer operations go to the slow ALU 1120 as the slow ALU 1120 includes integer execution hardware for long latency type of operations, such as a multiplier, shifts, flag logic, and branch processing. Memory load/store operations are executed by the AGUs 1122, 1124. For one implementation, the integer ALUs 1116, 1118, 1120, are described in the context of performing integer operations on 64 bit data operands. In alternative implementations, the ALUs 1116, 1118, 1120, can be implemented to support a variety of data bits including 16, 32, 128, 256, etc. Similarly, the floating point units 1122, 1124, can be implemented to support a range of operands having bits of various widths. For one implementation, the floating point units 1122, 1124, can operate on 128 bits wide packed data operands in conjunction with SIMD and multimedia instructions.

In one implementation, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 12:
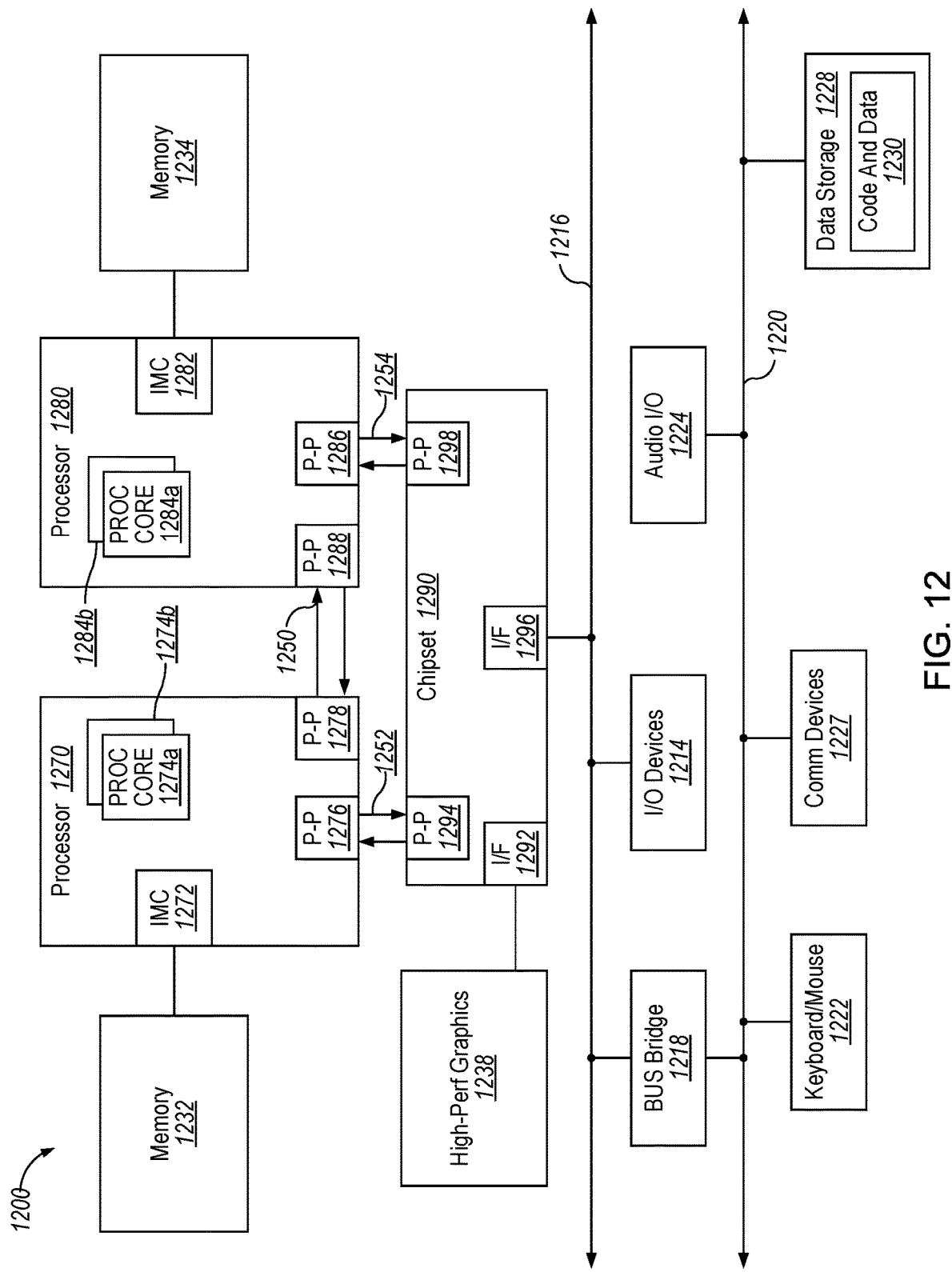
FIG. 12 is a block diagram of a computer system according to one implementation.

Implementations may be implemented in many different system types. Referring now to FIG. 12, shown is a block diagram of a multiprocessor system 1200 that may implement hardware support for restricting usage of encryption keys by untrusted software, in accordance with an implementation. As shown in FIG. 12, multiprocessor system 1200 is a point-to-point interconnect system, and includes a first processor 1270 and a second processor 1280 coupled via a point-to-point interconnect 1250. As shown in FIG. 12, each of processors 1270 and 1280 may be multicore processors, including first and second processor cores (i.e., processor cores 1274a and 1274b and processor cores 1284a and 1284b), although potentially many more cores may be present in the processors. While shown with two processors 1270, 1280, it is to be understood that the scope of the disclosure is not so limited. In other implementations, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may exchange information with a chipset 1290 via individual P-P interfaces 1252, 1254 using point to point interface circuits 1276, 1294, 1286, 1298. Chipset 1290 may also exchange information with a high-performance graphics circuit 1238 via a high-performance graphics interface 1292.

Chipset 1290 may be coupled to a first bus 1216 via an interface 1296. In one implementation, first bus 1216 may be a Peripheral Component Interconnect (PCI) bus, or a bus such as a PCI Express bus or interconnect bus, although the scope of the disclosure is not so limited.

As shown in FIG. 12, various I/O devices 1214 may be coupled to first bus 1216, along with a bus bridge 1218 which couples first bus 1216 to a second bus 1220. In one embodiment, second bus 1220 may be a low pin count (LPC) bus. Various devices may be coupled to second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to second bus 1220. Note that other architectures are possible. For example, instead of the point-to-point architecture of FIG. 12, a system may implement a multi-drop bus or other such architecture.

Figure 13:
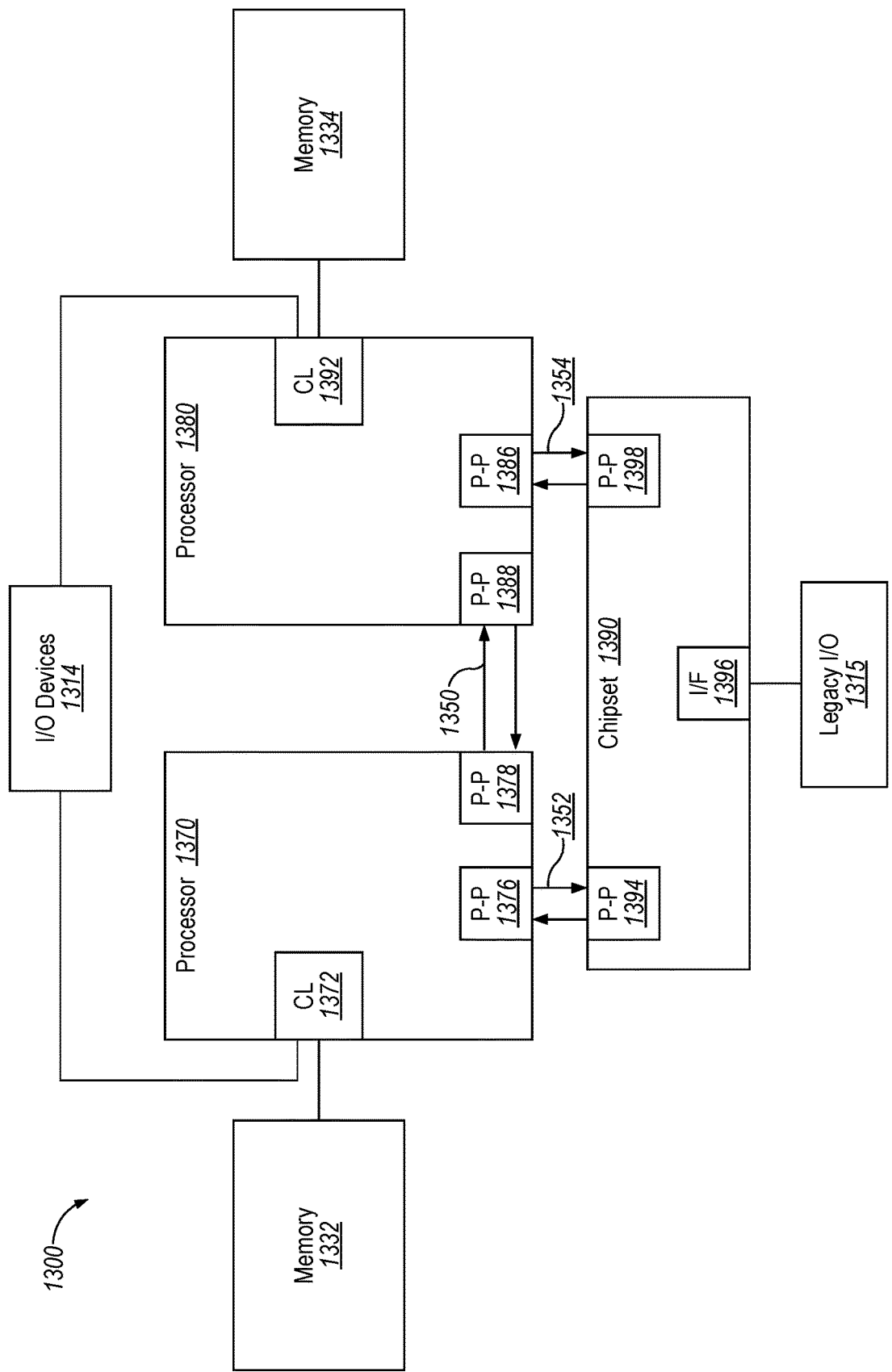
FIG. 13 is a block diagram of a computer system according to another implementation.

Referring now to FIG. 13, shown is a block diagram of a third system 1300 that may implement hardware support for restricting usage of encryption keys by untrusted software, in accordance with an implementation of the disclosure. Like elements in FIGS. 12 and 13 bear like reference numerals and certain aspects of FIG. 13 have been omitted from FIG. 12 in order to avoid obscuring other aspects of FIG. 12.

FIG. 13 illustrates processors 1370, 1380. In one embodiment, processors 970, 980 may implement hybrid cores as described above. Processors 1370, 1380 may include integrated memory and I/O control logic ("CL") 1372 and 1392, respectively and intercommunicate with each other via point-to-point interconnect 1350 between point-to-point (P-P) interfaces 1378 and 1388 respectively. Processors 1370, 1380 each communicate with chipset 1390 via point-to-point interconnects 1352 and 1354 through the respective P-P interfaces 1376 to 1394 and 1386 to 1398 as shown. For at least one implementation, the CL 1372, 1382 may include integrated memory controller units such as described herein. In addition. CL 1372, 1392 may also include I/O control logic. FIG. 13 illustrates that the memories 1332, 1334 are coupled to the CL 1372, 1392, and that I/O devices 1314 are also coupled to the control logic 1372, 1392. Legacy I/O devices 1315 are coupled to the chipset 1390 via interface 1396.

Figure 14:
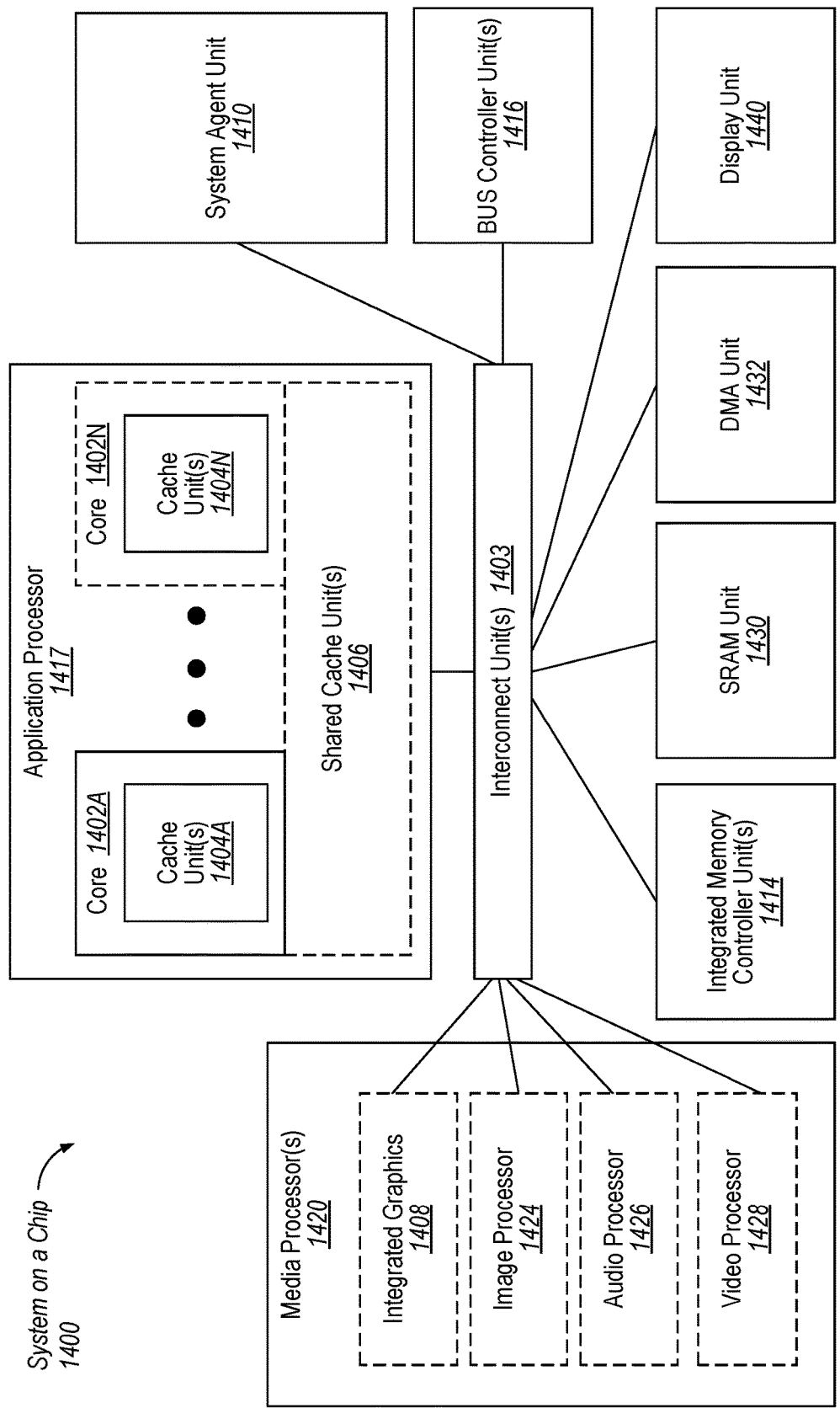
FIG. 14 is a block diagram of a system-on-a-chip according to one implementation.

FIG. 14 is an exemplary system on a chip (SoC) 1400 that may include one or more of the cores 1402A . . . 1402N that may implement hardware support for restricting usage of encryption keys by untrusted software. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1400 of FIG. 14, dashed lined boxes are features on more advanced SoCs. An interconnect unit(s) 1403 may be coupled to: an application processor 1417 which includes a set of one or more cores 1402A-N, containing one or more cache unit(s) 1404A . . . 1404N, respectively, and shared cache unit(s) 1406; a system agent unit 1410; a bus controller unit(s) 1416; an integrated memory controller unit(s) 1414; a set of one or more media processors 1420 which may include integrated graphics logic 1408, an image processor 1424 for providing still and/or video camera functionality, an audio processor 1426 for providing hardware audio acceleration, and a video processor 1428 for providing video encode/decode acceleration; a static random access memory (SRAM) unit 1430; a direct memory access (DMA) unit 1432; and a display unit 1440 for coupling to one or more external displays.

Figure 15:
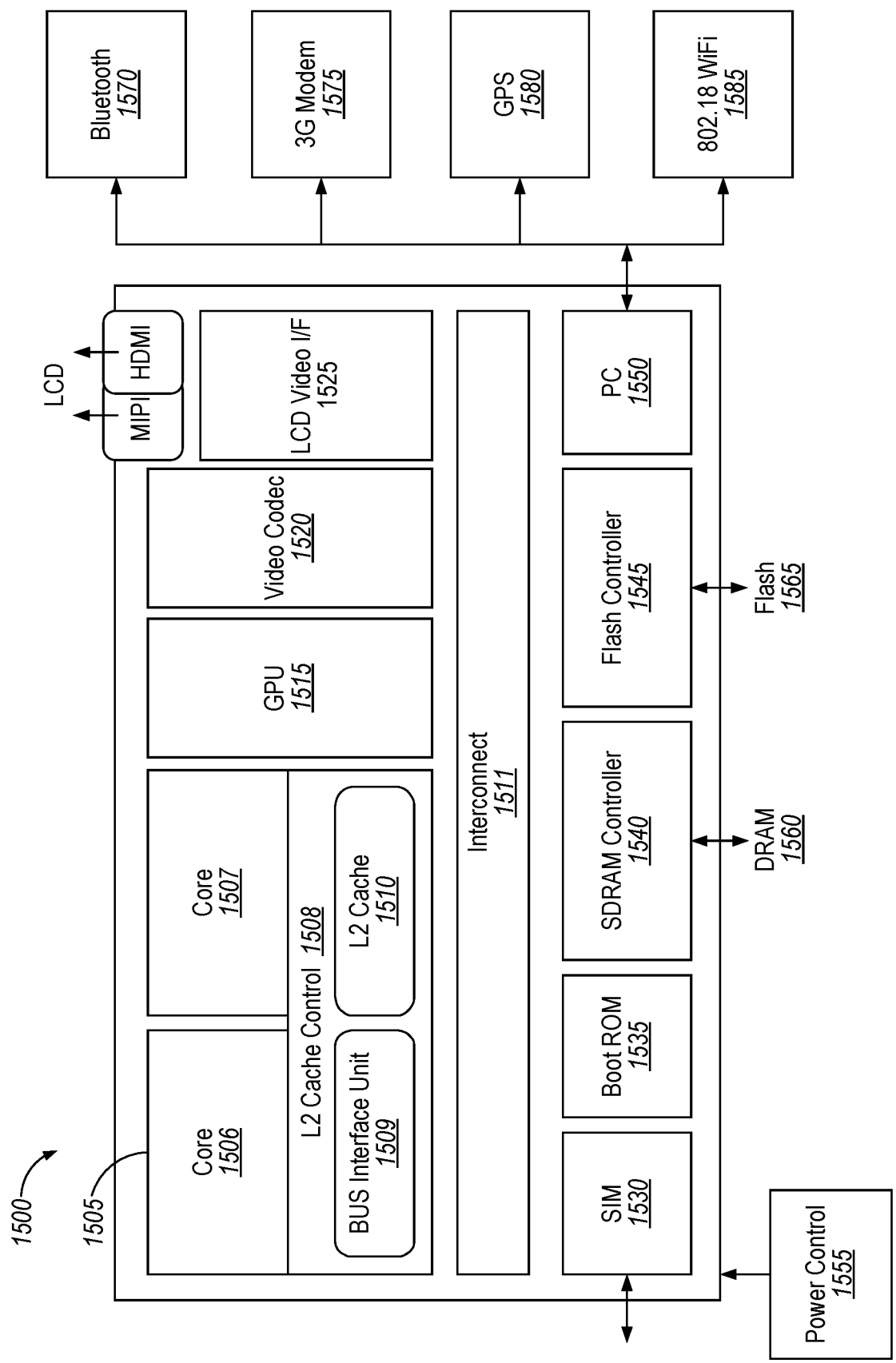
FIG. 15 illustrates another implementation of a block diagram for a computing system.

Turning next to FIG. 15, an implementation of a system on-chip (SoC) design that may implement hardware support for restricting usage of encryption keys by untrusted software, in accordance with implementations of the disclosure is depicted. As an illustrative example, SoC 1500 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1500.

Here, SoC 1500 includes 2 cores-1506 and 1507. Similar to the discussion above, cores 1506 and 1507 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1511 includes an on-chip interconnect, such as an IOSF, AMBA, or other interconnects discussed above, which can implement one or more aspects of the described disclosure.

In one implementation, SDRAM controller 1540 may connect to interconnect 1511 via cache 1510. Interconnect 1511 provides communication channels to the other components, such as a Subscriber Identity Module (SIM) 1530 to interface with a SIM card, a boot ROM 1535 to hold boot code for execution by cores 1506 and 1507 to initialize and boot SoC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the implementations described herein.

In addition, the system illustrates peripherals for communication, such as a power control module 1555, a Bluetooth® module 1570, 3G modem 1575, GPS 1580, and Wi-Fi® 1585. Note as stated above, a UE includes a radio for communication. As a result, these peripheral communication modules may not all be included. However, in a UE some form of a radio for external communication should be included.

Figure 16:
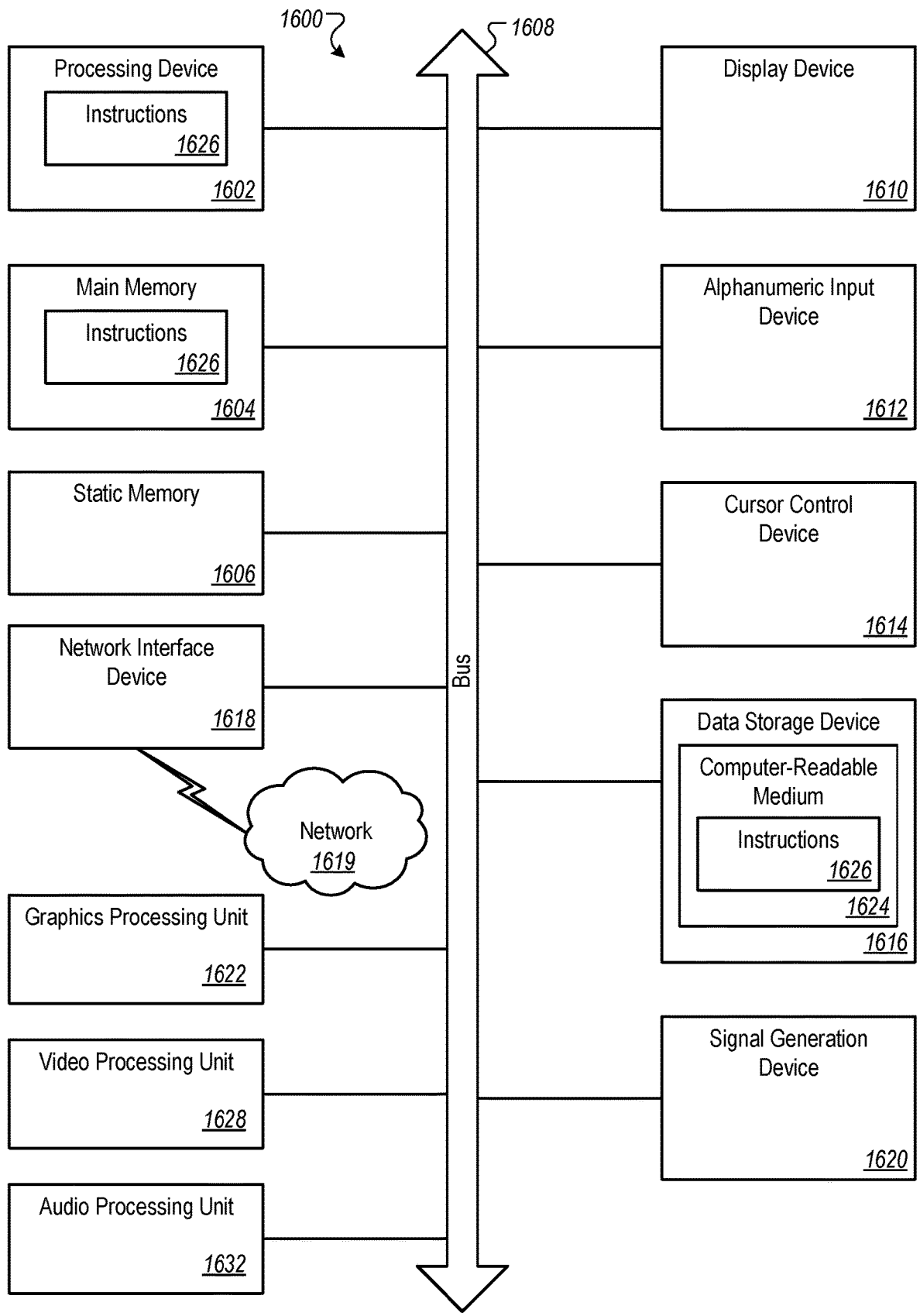
FIG. 16 illustrates another implementation of a block diagram for a computing system.

FIG. 16 illustrates a diagrammatic representation of a machine in the example form of a computing system 1600 within which a set of instructions, for causing the machine to implement hardware support for restricting usage of encryption keys by untrusted software according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1600.

The computing system 1600 includes a processing device 1602, main memory 1604 (e.g., flash memory, dynamic random access memory (DRAM) (such as synchronous DRAM (SDRAM) or DRAM (RDRAM), etc.), a static memory 1606 (e.g., flash memory, static random access memory (SRAM), etc.), and a data storage device 1616, which communicate with each other via a bus 1608.

Processing device 1602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1602 may also be one or more special-purpose processing devices such as an application-specific integrated circuit (ASIC), a field programmable gate array (FPGA), a digital signal processor (DSP), network processor, or the like. In one implementation, processing device 1602 may include one or more processor cores. The processing device 1602 is configured to execute the processing logic 1626 for performing the operations discussed herein.

In one implementation, processing device 1602 can be part of a processor or an integrated circuit that includes the disclosed LLC caching architecture. Alternatively, the computing system 1600 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1600 may further include a network interface device 1618 communicably coupled to a network 1619. The computing system 1600 also may include a video display device 1610 (e.g., a liquid crystal display (LCD) or a cathode ray tube (CRT)), an alphanumeric input device 1612 (e.g., a keyboard), a cursor control device 1614 (e.g., a mouse), a signal generation device 1620 (e.g., a speaker), or other peripheral devices. Furthermore, computing system 1600 may include a graphics processing unit 1622, a video processing unit 1628 and an audio processing unit 1632. In another implementation, the computing system 1600 may include a chipset (not illustrated), which refers to a group of integrated circuits, or chips, that are designed to work with the processing device 1602 and controls communications between the processing device 1602 and external devices. For example, the chipset may be a set of chips on a motherboard that links the processing device 1602 to very high-speed devices, such as main memory 1604 and graphic controllers, as well as linking the processing device 1602 to lower-speed peripheral buses of peripherals, such as USB, PCI or ISA buses.

The data storage device 1616 may include a computer-readable storage medium 1624 on which is stored software 1626 embodying any one or more of the methodologies of functions described herein. The software 1626 may also reside, completely or at least partially, within the main memory 1604 as instructions 1626 and/or within the processing device 1602 as processing logic during execution thereof by the computing system 1600; the main memory 1604 and the processing device 1602 also constituting computer-readable storage media.

The computer-readable storage medium 1624 may also be used to store instructions 1626 utilizing the processing device 1602, and/or a software library containing methods that call the above applications. While the computer-readable storage medium 1624 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is processor comprising: 1) a cryptographic engine to control access, using an secure region key identifier (ID), to one or more memory range of memory allocable for flexible conversion to secure pages of architecturally-protected memory regions; and 2) a processor core coupled to the cryptographic engine, the processor core to: a) determine that a physical address associated with a request to access the memory corresponds to an secure page within the one or more memory range of the memory; b) determine that a first key ID located within the physical address does not match the secure region key ID; and c) issue a page fault and deny access to the secure page in the memory.

In Example 2, the processor of Example 1, wherein the processor core further comprises a set of instructions in firmware that performs a basic input-output system (BIOS), wherein the processor core is to execute the set of instructions to: a) discover that a host-convertible secure region mode and a secure extensions mode are enabled; b) program a secure extensions key into the cryptographic engine to correspond to the secure region key ID; and c) reserve the one or more memory range of the memory for flexible conversion to the secure pages.

In Example 3, the processor of Example 2, wherein the processor core is further to execute memory check firmware to fail a memory check process in response to detection that the secure region key ID has not been allocated for use with the secure extensions key.

In Example 4, the processor of Example 2, wherein the processor core is further to execute the set of instructions to allocate one of a plurality of key IDs for exclusive use as the secure region key ID.

In Example 5, the processor of Example 2, wherein the processor core is further to execute a central processor unit identifier (CPUID) instruction, wherein the CPUID instruction having: 1) first register inputs to determine the one or more memory range of the memory allocated for flexible conversion to secure pages; and 2) second register inputs to determine the secure region key ID and associated security properties.

In Example 6, the processor of Example 1, wherein the processor core is further to map, using the secure region key ID, a second guest virtual address of the secure page to a second physical address within the page tables and the extended page tables, such that the second physical address contains the secure region key ID.

Various implementations may have different combinations of the structural features described above. For instance, all optional features of the processors and methods described above may also be implemented with respect to a system described herein and specifics in the examples may be used anywhere in one or more implementations.

Example 7 is a processor comprising: 1) a cryptographic engine to control access, using an secure region key identifier (ID), to one or more memory range of memory allocable for flexible conversion to secure pages of architecturally protected memory regions; and 2) a processor core coupled to the cryptographic engine, the processor core to: a) determine that a physical address associated with a request to access the memory corresponds to a non-secure page of the memory; c) determine that a first key ID, which is located within the physical address, matches the secure region key ID; and d) deny access to the non-secure page of the memory.

In Example 8, the processor of Example 7, wherein the processor core is further to: a) replace the physical address in the request with an abort page address, which links to an abort page containing incorrect data; and b) allow access, by a system agent that issued the request, to the abort page.

In Example 9, the processor of Example 7, wherein the processor core further comprises a set of instructions in firmware that performs a basic input-output system (BIOS), wherein the processor core is to execute the set of instructions to: a) discover that a host-convertible secure region mode and a secure extensions mode are enabled; b) program a secure extensions key into the cryptographic engine to correspond to the secure region key ID; and c) reserve the one or more memory range of the memory for flexible conversion to the secure pages.

In Example 10, the processor of Example 9, wherein the processor core is further to execute the set of instructions to allocate one of a plurality of key IDs for exclusive use as the secure region key ID.

In Example 11, the processor of Example 9, wherein the processor core is further to execute memory check firmware to fail a memory check process in response to detection that the secure region key ID has not been allocated for use with the secure extensions key.

In Example 12, the processor of Example 9, wherein the processor core is further to execute a central processor unit identifier (CPUID) instruction, wherein the CPUID instruction having: 1) first register inputs to determine the one or more memory range of the memory allocated for flexible conversion to secure pages; and 2) second register inputs to determine the secure region key ID and associated security properties.

Various implementations may have different combinations of the structural features described above. For instance, all optional features of the processors and methods described above may also be implemented with respect to a system described herein and specifics in the examples may be used anywhere in one or more implementations.

Example 13 is a system comprising: 1) a cache and home agent (CHA) of a memory subsystem, the CHA to: a) set a mesh secure bit of a cache line in response to detection that a first key identifier (ID) in a physical address of the cache line matches an secure region key ID; and b) issue a write operation to memory for the cache line; and 2) a cryptographic engine coupled to the CHA, wherein the cryptographic engine is to set a memory secure bit, which resides in metadata of the cache line in the memory, to a value of the mesh secure bit as part of completion of the write operation.

In Example 14, the system of Example 13, wherein the cryptographic engine is further to: a) detect a read operation directed to the cache line stored in the memory; and b) to fulfill the read operation, return a poison bit to a requesting agent in response to detection of a mismatch between values of mesh secure bit and memory secure bit.

In Example 15, the system of Example 14, wherein the cryptographic engine, to fulfill the read operation, is further to return a fixed pattern of data to the requesting agent.

In Example 16, the system of Example 13, wherein the cryptographic engine is further to: a) detect a read operation directed to the cache line stored in the memory; and b) to fulfill the read operation, return data of the cache line to a requesting agent in response to a determination that values of the mesh secure bit and the memory secure bit match.

Various implementations may have different combinations of the structural features described above. For instance, all optional features of the processors and methods described above may also be implemented with respect to a system described herein and specifics in the examples may be used anywhere in one or more implementations.

Example 17 is a method comprising: 1) selecting, by a processor, an evicted page of memory to convert to a first secure page; and 2) executing, by the processor, a secure region conversion instruction to initialize the evicted page as the first secure page by: 3) writing content of the evicted page as zero values; 4) calculating a message authentication code (MAC) value using a physical address of the evicted page, data to be stored to the first secure page, and a secure region key identifier (ID) corresponding to an architecturally protected memory region of the memory containing the first secure page; and 5) storing the MAC value to the first secure page.

In Example 18, the method of Example 17, further comprising: 1) executing, by the processor, a memory fence instruction to verify operations associated with initialization of the first secure page are completed; and 2) making the first secure page accessible, by the processor, to one of a virtual machine or an application authorized to access the architecturally protected memory region of the memory.

In Example 19, the method of Example 18, further comprising: 1) selecting, by the processor, the first secure page for eviction and transition to be a non-secure page; 2) making the first secure page inaccessible by one of a virtual machine or an application authorized to access the architecturally protected memory region of the memory; 3) invalidating mappings of the first secure page in a translation lookaside buffer of the processor; 4) executing, by the processor, a non-secure region conversion instruction to cause write back to the memory and flush of contents of one or more cache line, corresponding to the first secure page, that contains the secure region key ID; and 5) returning the first secure page to a list of evicted pages available to the processor to allocate for use to store data associated with a new key ID.

In Example 20, the method of Example 17, further comprising: 1) determining that a physical address associated with a request to access the memory corresponds to the first secure page within the one or more memory range of the memory; 2) determining that a first key ID located within the physical address does not match the secure region key ID; and 3) issuing a page fault and denying access, by a system agent that issued the request, to the first secure page in the memory.

In Example 21, the method of Example 17, further comprising: 1) determining that a physical address associated with a request to access the memory corresponds to a non-secure page of the memory; 3) determining that a first key ID, which is located within the physical address, matches the secure region key ID; and 4) denying access, by a system agent that issued the request, to the non-secure region page of the memory.

Various implementations may have different combinations of the structural features described above. For instance, all optional features of the processors and methods described above may also be implemented with respect to a system described herein and specifics in the examples may be used anywhere in one or more implementations.

Example 22 is a non-transitory computer-readable medium storing instructions, which when executed by a processor having a core coupled to a system memory, cause the processor to execute a plurality of logic operations comprising: 1) selecting, by a processor, an evicted page of memory to convert to a first secure region page; and 2) executing, by the processor, a secure region conversion instruction to initialize the evicted page as the first secure page by: 3) writing content of the evicted page as zero values; 4) calculating a message authentication code (MAC) value using a physical address of the evicted page, data to be stored to the first secure page, and an secure region key identifier (ID) corresponding to an architecturally protected memory region of the memory containing the first secure page; and 5) storing the MAC value to the first secure page.

In Example 23, the non-transitory computer-readable medium of Example 22, the plurality of logic operations further comprising: 1) executing, by the processor, a memory fence instruction to verify operations associated with initialization of the first secure page are completed; and 2) making the first secure page accessible, by the processor, to one of a virtual machine or an application authorized to access the architecturally protected memory region of the memory.

In Example 24, the non-transitory computer-readable medium of Example 23, the plurality of logic operations further comprising: 1) selecting, by the processor, the first secure page for eviction and transition to be a non-secure page; 2) making the first secure page inaccessible by one of a virtual machine or an application authorized to access the architecturally protected memory region of the memory; 3) invalidating mappings of the first secure page in a translation lookaside buffer of the processor; 4) executing, by the processor, a non-secure region conversion instruction to cause write back to the memory and flush of contents of one or more cache line, corresponding to the first secure page, that contains the secure region key ID; and 5) returning the first secure page to a list of evicted pages available to the processor to allocate for use to store data associated with a new key ID.

In Example 25, the non-transitory computer-readable medium of Example 22, the plurality of logic operations further comprising: 1) responsive to receipt of a request to access the memory, performing a walk of page tables and extended page tables to translate a guest virtual address of the request to a physical address; 2) determining that the physical address corresponds to the first secure page within the one or more memory range of the memory; 3) determining that a first key ID located within the physical address does not match the secure region key ID; and 4) issuing a page fault and denying access, by a system agent that issued the request, to the first secure page in the memory.

In Example 26, the non-transitory computer-readable medium of Example 22, the plurality of logic operations further comprising: 1) responsive to receipt of a request to access the memory, performing a walk of page tables and extended page tables to translate a guest virtual address of the request to a physical address; 2) determining that the physical address corresponds to a non-secure page of the memory; 3) determining that a first key ID, which is located within the physical address, matches the secure region key ID; and 4) denying access, by a system agent that issued the request, to the non-secure page of the memory.

Example 27 is a system comprising means for performing the method of any of Examples 17-21.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' 'capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware or firmware.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a cryptographic engine to control access, using a secure region key identifier (ID), to one or more memory range of memory allocable for flexible conversion to secure pages of architecturally-protected memory regions; and
   a processor core coupled to the cryptographic engine, the processor core to:
      determine that a physical address associated with a request to access the memory corresponds to a secure page within the one or more memory range of the memory;
      determine that a first key ID located within the physical address does not match the secure region key ID; and
      issue a page fault and deny access to the secure page in the memory, wherein one of:
      the processor core further comprises a set of instructions in firmware that performs a basic input-output system (BIOS), wherein the processor core is to execute the set of instructions to:
         discover that a host-convertible secure region mode and a secure extensions mode are enabled,
         program a secure extensions key into the cryptographic engine to correspond to the secure region key ID, and
         reserve the one or more memory range of the memory for flexible conversion to the secure pages, or
      the processor core is further to map, using the secure key ID, a guest virtual address of the secure page to a second physical address within page tables and extended page tables, such that the second physical address contains the secure region key ID.

2. The processor of claim 1, wherein the one is the processor core further comprises the set of instructions in firmware that performs the basic input-output system (BIOS), wherein the processor core is to execute the set of instructions to:
   discover that the host-convertible secure region mode and the secure extensions mode are enabled;
   program the secure extensions key into the cryptographic engine to correspond to the secure region key ID; and
   reserve the one or more memory range of the memory for flexible conversion to the secure pages.

3. The processor of claim 2, wherein the processor core is further to execute memory check firmware to fail a memory check process in response to detection that the secure region key ID has not been allocated for use with the secure extensions key.

4. The processor of claim 2, wherein the processor core is further to execute the set of instructions to allocate one of a plurality of key IDs for exclusive use as the secure region key ID.

5. The processor of claim 2, wherein the processor core is further to execute a central processor unit identifier (CPUID) instruction, wherein the CPUID instruction having:
   first register inputs to determine the one or more memory range of the memory allocated for flexible conversion to secure pages; and second register inputs to determine the secure key ID and associated security properties.

6. The processor of claim 1, wherein the one is the processor core is further to map, using the secure key ID, the guest virtual address of the secure page to the second physical address within page tables and extended page tables, such that the second physical address contains the secure region key ID.

7. A processor comprising:
a cryptographic engine to control access, using a secure region key identifier (ID), to one or more memory range of memory allocable for flexible conversion to secure pages of architecturally protected memory regions; and
a processor core coupled to the cryptographic engine, the processor core to:
  determine that a physical address associated with a request to access the memory corresponds to a non-secure page of the memory;
  determine that a first key ID, which is located within the physical address, matches the secure region key ID; and
  deny access to the non-secure page of the memory, wherein one of:
  the processor core is further to:
    replace the physical address in the request with an abort page address, which links to an abort page containing incorrect data, and
    allow access, by a system agent that issued the request, to the abort page, or
  the processor core further comprises a set of instructions in firmware that performs a basic input-output system (BIOS), wherein the processor core is to execute the set of instructions to:
    discover that a host-convertible secure region mode and a secure extensions mode are enabled,
    program a secure extensions key into the cryptographic engine to correspond to the secure region key ID, and
    reserve the one or more memory range of the memory for flexible conversion to the secure pages.

8. The processor of claim 7, wherein the one is the processor core is further to:
replace the physical address in the request with the abort page address, which links to the abort page containing incorrect data; and
allow access, by the system agent that issued the request, to the abort page.

9. The processor of claim 7, wherein the one is the processor core further comprises the set of instructions in firmware that performs the basic input-output system (BIOS), wherein the processor core is to execute the set of instructions to:
discover that the host-convertible secure region mode and the secure extensions mode are enabled;
program the secure extensions key into the cryptographic engine to correspond to the secure region key ID; and
reserve the one or more memory range of the memory for flexible conversion to the secure pages.

10. The processor of claim 9, wherein the processor core is further to execute the set of instructions to allocate one of a plurality of key IDs for exclusive use as the secure region key ID.

11. The processor of claim 9, wherein the processor core is further to execute memory check firmware to fail a memory check process in response to detection that the secure region key ID has not been allocated for use with the secure extensions key.

12. The processor of claim 9, wherein the processor core is further to execute a central processor unit identifier (CPUID) instruction, wherein the CPUID instruction having:
first register inputs to determine the one or more memory range of the memory allocated for flexible conversion to secure pages; and
second register inputs to determine the secure region key ID and associated security properties.

13. A system comprising:
a cache and home agent (CHA) of a memory subsystem, the CHA to:
  set a mesh secure bit of a cache line in response to detection that a first key identifier (ID) in a physical address of the cache line matches a secure region key ID; and
  issue a write operation to memory for the cache line; and
a cryptographic engine coupled to the CHA, wherein the cryptographic engine is to set a memory secure bit, which resides in metadata of the cache line in the memory, to a value of the mesh secure bit as part of completion of the write operation.

14. The system of claim 13, wherein the cryptographic engine is further to:
detect a read operation directed to the cache line stored in the memory; and
to fulfill the read operation, return a poison bit to a requesting agent in response to detection of a mismatch between values of mesh secure bit and memory secure bit.

15. The system of claim 14, wherein the cryptographic engine, to fulfill the read operation, is further to return a fixed pattern of data to the requesting agent.

16. The system of claim 13, wherein the cryptographic engine is further to:
detect a read operation directed to the cache line stored in the memory; and
to fulfill the read operation, return data of the cache line to a requesting agent in response to a determination that values of the mesh secure bit and the memory secure bit match.

17. A method comprising:
selecting, by a processor, an evicted page of memory to convert to a first secure page; and
executing, by the processor, a secure region conversion instruction to initialize the evicted page as the first secure page by:
  writing content of the evicted page as zero values;
  calculating a message authentication code (MAC) value using a physical address of the evicted page, data to be stored to the first secure page, and a secure region key identifier (ID) corresponding to an architecturally protected memory region of the memory containing the first secure page; and
  storing the MAC value to the first secure page.

18. The method of claim 17, further comprising:
executing, by the processor, a memory fence instruction to verify operations associated with initialization of the first secure page are completed; and making the first secure page accessible, by the processor, to one of a virtual machine or an application authorized to access the architecturally protected memory region of the memory.

19. The method of claim 18, further comprising:
selecting, by the processor, the first secure page for eviction and transition to be a non-secure page;
making the first secure page inaccessible by one of a virtual machine or an application authorized to access the architecturally protected memory region of the memory;
invalidating mappings of the first secure page in a translation lookaside buffer of the processor;
executing, by the processor, a non-secure region conversion instruction to cause write back to the memory and flush of contents of one or more cache line, corresponding to the first secure page, that contains the secure region key ID; and
returning the first secure page to a list of evicted pages available to the processor to allocate for use to store data associated with a new key ID.

20. The method of claim 17, further comprising:
determining that a physical address associated with a request to access the memory corresponds to the first secure page within the one or more memory range of the memory;
determining that a first key ID located within the physical address does not match the secure region key ID; and
issuing a page fault and denying access, by a system agent that issued the request, to the first secure page in the memory.

21. The method of claim 17, further comprising:
determining that a physical address associated with a request to access the memory corresponds to a non-secure page of the memory;
determining that a first key ID, which is located within the physical address, matches the secure region key ID; and
denying access, by a system agent that issued the request, to the non-secure page of the memory.

* * * * *